(12) United States Patent
Kojima et al.

(10) Patent No.: US 7,887,717 B2
(45) Date of Patent: Feb. 15, 2011

(54) LIQUID-CRYSTALLINE MEDIUM AND LIQUID-CRYSTAL DISPLAY HAVING HIGH TWIST

(75) Inventors: Akihiro Kojima, Kanagawa Pref. (JP); Makoto Murakami, Kanagawa Pref. (JP); Fumio Shimano, Kanagawa Pref. (JP); Jeong-Hee Sung, Kanagawa Pref. (JP)

(73) Assignee: Merck Patent Gesellschaft Mit Beschranker Haftung, Darmstadt (DE)

( * ) Notice: Subject to any disclaimer, the term of this patent is extended or adjusted under 35 U.S.C. 154(b) by 0 days.

(21) Appl. No.: 12/397,439

(22) Filed: Mar. 4, 2009

(65) Prior Publication Data
US 2009/0225270 A1    Sep. 10, 2009

(30) Foreign Application Priority Data
Mar. 5, 2008    (EP)    ................................. 08004051

(51) Int. Cl.
*C09K 19/00*    (2006.01)
*C09K 19/06*    (2006.01)
*C09K 19/52*    (2006.01)
*G02F 1/03*    (2006.01)
*G02F 1/1333*    (2006.01)

(52) U.S. Cl. ............................ 252/299.63; 252/299.01; 252/299.6; 252/299.61; 430/20; 349/1; 349/185; 428/1.1

(58) Field of Classification Search ............ 252/299.01, 252/299.6, 299.61, 299.63; 349/1, 185; 430/20; 428/1.1
See application file for complete search history.

(56) References Cited

U.S. PATENT DOCUMENTS

| 6,858,268 | B2 * | 2/2005 | Suermann et al. ............ 428/1.1 |
| 7,452,575 | B2 * | 11/2008 | Francis et al. ................ 428/1.1 |
| 2004/0173775 | A1 * | 9/2004 | Suermann et al. ...... 252/299.63 |

* cited by examiner

*Primary Examiner*—Geraldina Visconti
(74) *Attorney, Agent, or Firm*—Millen, White, Zelano & Branigan, P.C.

(57) ABSTRACT

The present invention relates to a liquid-crystalline medium having high twist, to the use thereof for electro-optical purposes, and to displays containing this medium.

22 Claims, No Drawings

LIQUID-CRYSTALLINE MEDIUM AND LIQUID-CRYSTAL DISPLAY HAVING HIGH TWIST

The present invention relates to a liquid-crystalline medium having high twist, to the use thereof for electro-optical purposes, and to displays containing this medium.

Liquid-crystal displays are known from the prior art. The commonest display devices are based on the Schadt-Helfrich effect and contain a liquid-crystal medium having a twisted nematic structure, such as, for example, TN ("twisted nematic") cells having twist angles of typically 90° and STN ("super-twisted nematic") cells having twist angles of typically from 180 to 270°. Also known are ferroelectric liquid-crystal displays which contain a liquid-crystal medium having a twisted smectic structure. The twisted structure in these displays is usually achieved by addition of one or more chiral dopants to a nematic or smectic liquid-crystal medium.

Also known are liquid-crystal displays which contain liquid-crystal (LC) media having a chiral nematic or cholesteric structure. These media have significantly higher twist compared with the media from TN and STN cells.

Cholesteric liquid crystals exhibit selective reflection of circular-polarized light, with the direction of rotation of the light vector corresponding to the direction of rotation of the cholesteric helix. The reflection wavelength $\lambda$ is given by the pitch p of the cholesteric helix and the mean birefringence n of the cholesteric liquid crystal in accordance with equation (1):

$$\lambda = n \cdot p \qquad (1)$$

The terms "chiral nematic" and "cholesteric" are used alongside one another in the prior art. "Chiral nematic" frequently denotes LC materials having a nematic host mixture which has been doped with an optically active component which induces a helically twisted superstructure. By contrast, "cholesteric" frequently denotes chiral LC materials, for example cholesteryl derivatives, which have a "natural" cholesteric phase having a helical twist. The two terms are also used in parallel to denote the same thing. In the present application, the term "cholesteric" is used for both above-mentioned types of LC material, with this term being intended to cover the widest meaning of "chiral nematic" and "cholesteric" in each case.

Examples of customary cholesteric liquid-crystal (CLC) displays are the so-called SSCT ("surface stabilized cholesteric texture") and PSCT ("polymer stabilized cholesteric texture") displays. SSCT and PSCT displays usually contain a CLC medium which has, for example in the initial state, a planar and twisted structure which reflects light having a certain wavelength, and can be switched into a focally conical, light-scattering structure by application of an electrical alternating-voltage pulse, or vice versa. On application of a stronger voltage pulse, the CLC medium is converted into a homeotropic, transparent state, from where it relaxes into the planar state after rapid switching-off of the voltage or into the focally conical state after slow switching-off.

The planar alignment of the CLC medium in the initial state, i.e. before application of a voltage, is achieved in SSCT displays by, for example, surface treatment of the cell walls. In PSCT displays, the CLC medium additionally comprises a phase-separated polymer or polymer network which stabilises the structure of the CLC medium in the respective addressed state.

SSCT and PSCT displays generally do not require backlighting. In the planar state, the CLC medium in a pixel exhibits selective light reflection of a certain wavelength in accordance with the above equation (1), meaning that the pixel appears in the corresponding reflection color, for example in front of a black background. The reflection color disappears on changing into the focally conical, scattering or homeotropic, transparent state.

SSCT and PSCT displays are bistable, i.e. the respective state is retained after the electric field has been switched off and is only converted back into the initial state by application of a fresh field. In order to produce a pixel, a short voltage pulse is therefore sufficient, in contrast, for example, to electro-optical TN or STN displays, in which the LC medium in an addressed pixel immediately returns to the initial state after the electric field has been switched off, meaning that maintenance of the addressing voltage is necessary for durable production of a pixel.

For the above-mentioned reasons, CLC displays have significantly lower power consumption compared with TN or STN displays. In addition, they exhibit only slight viewing-angle dependence, or none at all, in the scattering state. In addition, they do not require active-matrix addressing as in the case of TN displays, but instead can be operated in the simpler multiplex or passive-matrix mode.

WO 92/19695 and U.S. Pat. No. 5,384,067 describe, for example, a PSCT display containing a CLC medium having positive dielectric anisotropy and up to 10% by weight of a phase-separated polymer network which is dispersed in the liquid-crystal material. U.S. Pat. No. 5,453,863 describes, for example, an SSCT display containing a polymer-free CLC medium having positive dielectric anisotropy.

Further displays known from the prior art in which CLC materials are used are the so-called flexoelectric displays, in particular those operated in "uniformly lying helix mode" (ULH mode). The flexoelectric effect and CLC materials which exhibit this effect have been described, for example, by Chandrasekhar in "Liquid Crystals", 2nd Edition, Cambridge University Press (1992), P. G. deGennes et al. in "The Physics of Liquid Crystals", 2nd Edition, Oxford Science Publications (1995), Patel and Meyer, Phys. Rev. Lett. 58 (15), 1538-1540 (1987) and Rudquist et al., Liq. Cryst. 22 (4), 445-449 (1997).

Flexoelectric CLC materials typically have an asymmetrical molecular structure and a strong dipole moment. On application of an electric field perpendicular to the cholesteric helix axis, the permanent dipoles are aligned in the direction of the field. At the same time, the LC director is distorted owing to the asymmetrical molecular structure, while the alignment of the cholesteric helix axis remains unchanged. This results in macroscopic polarization of the CLC material in the field direction and in a shift of the optical axis relative to the helix axis.

Flexoelectric displays are usually operated in so-called "uniformly lying helix" (ULH) mode, as described, for example, in P. Rudquist et al., Liq. Cryst. 23 (4), 503 (1997). To this end, a layer of a flexoelectric CLC material having high twist and short helix pitch, typically in the range from 0.2 µm to 1.0 µm, in particular less than 0.5 µm, between two transparent parallel electrodes is aligned in such a way that the cholesteric helix axis is aligned parallel to the electrodes and the CLC layer has a macroscopically uniform alignment. On application of an electric field to the cell perpendicular to the CLC layer, the LC director and thus the optical axis of the sample rotate in the layer plane. If the CLC layer is introduced between two linear polarizers, this results in a change in the transmission of linear-polarized light in the CLC material, which can be utilized in electro-optical displays. The flexoelectric effect is distinguished, inter alia, by very fast response times, typically from 6 μs to 100 μs, and by good contrast with a large number of grey shades.

Flexoelectric displays can be operated as transmissive or reflective displays, with active-matrix addressing or in multiplex or passive-matrix mode.

CLC materials having high twist for use in flexoelectric displays are described, for example, in EP 0 971 016 and GB 2,356,629. EP 0 971 016 proposes for this purpose chiral liquid-crystalline estradiol derivatives, and GB 2,356,629 proposes so-called bismesogenic compounds containing two mesogenic groups connected by flexible hydrocarbon chains in combination with chiral dopants.

A CLC medium for the above-mentioned displays can be prepared, for example, by doping a nematic LC mixture with a chiral dopant having a high twisting power. The pitch p of the induced cholesteric helix is then given by the concentration c and the helical twisting power HTP of the chiral dopant in accordance with equation (2):

$$p = (HTP \cdot c)^{-1} \quad (2)$$

It is also possible to use two or more dopants, for example in order to compensate for the temperature dependence of the HTP of the individual dopants and thus to achieve low temperature dependence of the helix pitch and the reflection wavelength of the CLC medium.

For use in the above-mentioned displays, the chiral dopants should have the highest possible helical twisting power and low temperature dependence, high stability and good solubility in the liquid-crystalline host phase. In addition, they should have as little adverse effect as possible on the liquid-crystalline and electro-optical properties of the liquid-crystalline host phase. A high helical twisting power of the dopants is desired, inter alia for achieving small pitches, for example in cholesteric displays, but also in order to be able to reduce the concentration of the dopant. This firstly achieves a reduction in potential impairment of the properties of the liquid-crystal medium by the dopant and secondly increases the latitude regarding the solubility of the dopant, also enabling, for example, dopants of relatively low solubility to be used.

For use in flexoelectric displays, CLC materials should additionally have a sufficiently strong flexoelectric effect.

In general, CLC materials for use in the above-mentioned displays must have good chemical and thermal stability and good stability to electric fields and electromagnetic radiation. Furthermore, the liquid-crystal materials should have a broad cholesteric liquid-crystal phase having a high clearing point, sufficiently high birefringence, high positive dielectric anisotropy and low rotational viscosity.

The CLC materials should in addition be of such a nature that different reflection wavelengths, in particular in the visible region, can be achieved by simple and targeted variation. Furthermore, they should have low temperature dependence of the reflection wavelength.

Since liquid crystals are generally used in the form of mixtures of a plurality of components, it is important that the components are readily miscible with one another. Further properties, such as the dielectric anisotropy and the optical anisotropy, have to meet different requirements depending on the cell type.

However, it is not possible to achieve favorable values for all the above-mentioned parameters using the media available from the prior art.

EP 0 450 025 describes, for example, a cholesteric liquid-crystal mixture containing a nematic liquid crystal comprising two or more chiral dopants. However, the mixtures shown therein have only low clearing points. In addition, they comprise a high proportion of 26% of chiral dopants. However, high concentrations of dopant generally result in an impairment of the liquid-crystalline and electro-optical properties of the CLC medium.

The materials known from the prior art for flexoelectric and CLC displays often do not have sufficiently broad LC phases, sufficiently low viscosity values and sufficiently high values of the dielectric anisotropy. In addition, they require high switching voltages and often do not have birefringence values matched to the requisite LC layer thickness.

Thus, for example for many CLC displays, a CLC medium having high birefringence Δn is necessary in order to achieve high reflectivity, while other CLC displays, for example displays whose priority is high color saturation (multicolor CLC displays), require a low value of Δn.

On the other hand, in specific display applications, for example in multilayer RGB panels having different impedance, it is required to have CLC mixtures which exhibit a high clearing temperature, a high birefringence Δn, a high positive value of the dielectric anisotropy Δ∈, and do at the same time exhibit a high value of the dielectric constant $\in_\perp$ perpendicular to the long molecular axis of the LC molecule. However, it has been found that a high value of Δ∈ and simultaneously a high value of $\in_\perp$ cannot be achieved to an adequate extent using the CLC media known from the prior art.

There is thus a great demand for CLC media having high twist, a large working-temperature range, short response times, a low threshold voltage, low temperature dependence of the reflection wavelength and in particular having simultaneously high values of Δn, Δ∈ and $\in_\perp$, which do not have the disadvantages of the media known from the prior art.

For use in CLC displays, in particular in SSCT displays, the CLC media should in addition simultaneously have good dielectric behavior, a broad operating-temperature range and good color saturation.

One aspect of the invention is to provide CLC media, in particular for use in flexoelectric displays, CLC displays, such as SSCT and PSCT displays, and other bistable CLC displays which have the above-mentioned required properties and do not have the disadvantages of the media known from the prior art.

In accordance with the invention, media as described below are suitable for use in displays of this type.

In accordance with the invention, a liquid-crystalline (LC) medium is provided having a helically twisted structure comprising a nematic component and an optically active component, characterized in that the optically active component comprises one or more chiral compounds whose helical twisting power and concentration are selected in such a way that the helix pitch of the medium is ≦1 μm, and the nematic component comprises one or more compounds selected from compounds of formula I and II

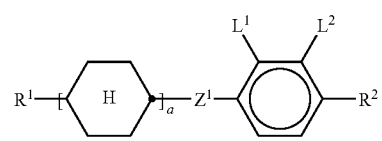

-continued

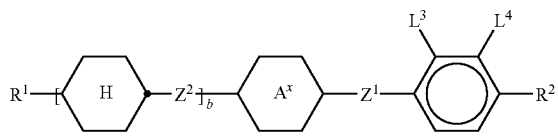

II in which
a is 1 or 2,
b is 0 or 1,

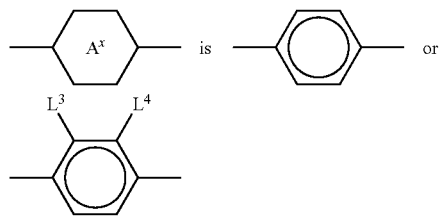

$R^1$ and $R^2$ denote independently of each other alkyl having from 1 to 12 C-atoms, wherein one or two non-adjacent $CH_2$-groups are optionally replaced by —O—, —CH=CH—, —C≡C—, —CO—, —OCO— or —COO— in such a way that O atoms are not linked directly to one another, preferably alkyl or alkoxy having from 1 to 6 C-atoms, $Z^1$ and $Z^2$ denote independently of each other —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2$O—, or a single bond, preferably a single bond, and $Z^1$ in formula II may also denote —C≡C—, $L^{1-4}$ denote independently of each other F, Cl, $OCF_3$, $CF_3$, $CH_3$, $CH_2F$, $CHF_2$.

Preferably both $L^1$ and $L^2$ denote F, or one of $L^1$ and $L^2$ is F and the other is Cl. Further preferably both $L^3$ and $L^4$ denote F, or one of $L^3$ and $L^4$ is F and the other is Cl.

The invention furthermore relates to the use of the CLC media according to the invention for electro-optical purposes, in particular in bistable CLC displays, CLC displays, such as SSCT and PSCT displays, and in flexoelectric displays.

The invention furthermore relates to an electro-optical display, in particular a bistable, CLC, SSCT, PSCT or flexoelectric display, having two plane-parallel outer plates which, together with a frame, form a cell, and a CLC medium located in the cell, where the CLC medium is a medium having a helically twisted structure comprising a nematic component and an optically active component, characterized in that the optically active component comprises one or more chiral compounds whose helical twisting power and concentration are selected in such a way that the helix pitch of the medium is <1 μm, and the nematic component comprises one or more compounds selected from compounds of formula I and II.

Surprisingly, it has been found that it is possible to provide a CLC medium in accordance with the present invention having a reflection wavelength in the visible region and/or a cholesteric phase at room temperature which has high birefringence values, high positive values of the dielectric anisotropy Δ∈ in order to achieve low response times, and at the same time high values of $∈_{195}$. In the CLC media according to the invention, this is achieved, in particular, through the use of compounds of the formulae I and II together with additional nematic or nematogenic compounds and with highly twisting chiral dopants as described below.

Thus, the use of the compounds of the formulae I and II in the mixtures for CLC displays, together with additional nematic or nematogenic compounds having a high positive Δ∈, enables the preparation of mixtures having sufficiently high polarity, low threshold voltages, short response times and a broad operating-temperature range.

In addition, the CLC media according to the invention, on use in CLC displays, exhibit excellent properties with respect to color saturation and UV stability through the combination of the compounds of the formulae I and II. In particular, this enables the achievement of CLC and SSCT displays which are also able to display the color red without appearing orange through the high yellow and green components of the SSCT displays known to date.

Surprisingly, the achievement of the high polarity that is necessary for acceptable switching voltages is not adversely affected here by the use of the compounds of formula I and II, which mostly exhibit a negative Δ∈.

Furthermore, the mixtures according to the invention are distinguished by the following advantages:

they have a broad cholesteric phase range, in particular at low temperatures, and a high clearing point, they have high UV stability.

The compounds of the formulae I and II have a broad range of applications. Depending on the choice of substituents, these compounds can serve as base materials of which liquid-crystalline media are predominantly composed; however, it is also possible to add compounds of the formulae I and II to liquid-crystalline base materials from other classes of compound in order, for example, to modify the dielectric and/or optical anisotropy of a dielectric of this type and/or to optimise its threshold voltage and/or its viscosity. In the pure state, the compounds of the formulae I and II are colorless and form liquid-crystalline mesophases in a temperature range which is favorably located for electro-optical use. They are stable chemically, thermally and to light.

The compounds of the formula I are preferably selected from the following subformulae:

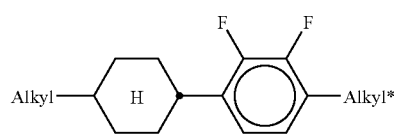

I1

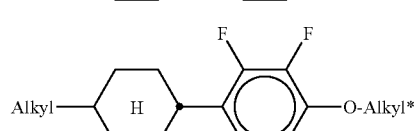

I2

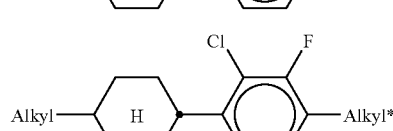

I3

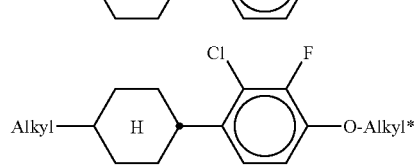

I4

-continued
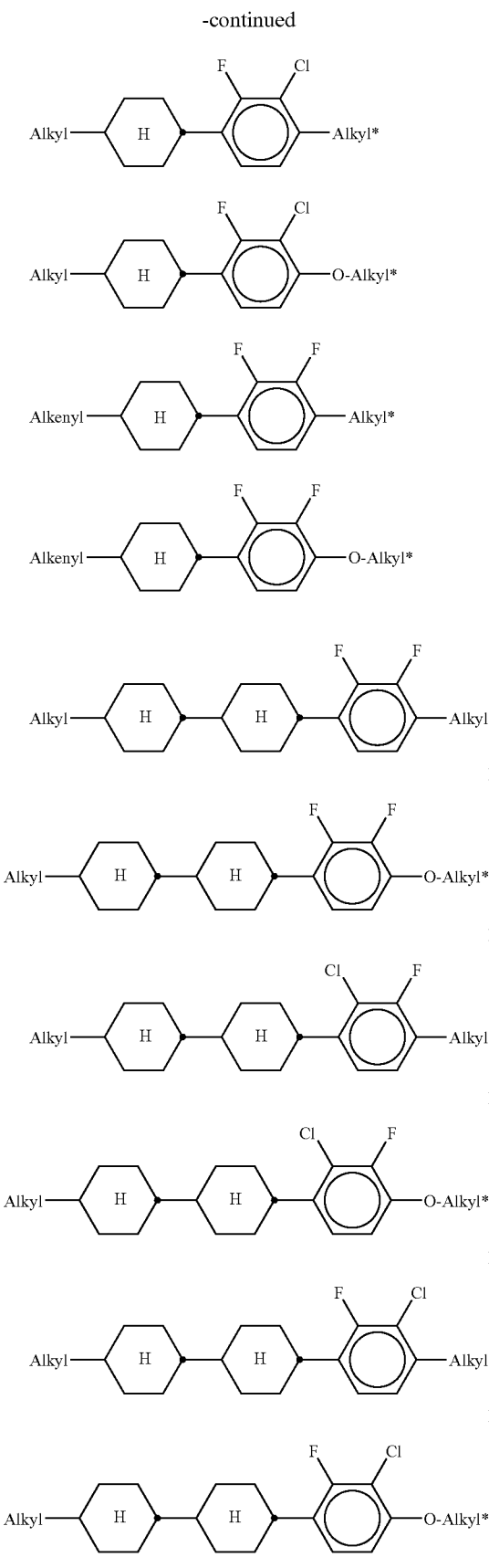
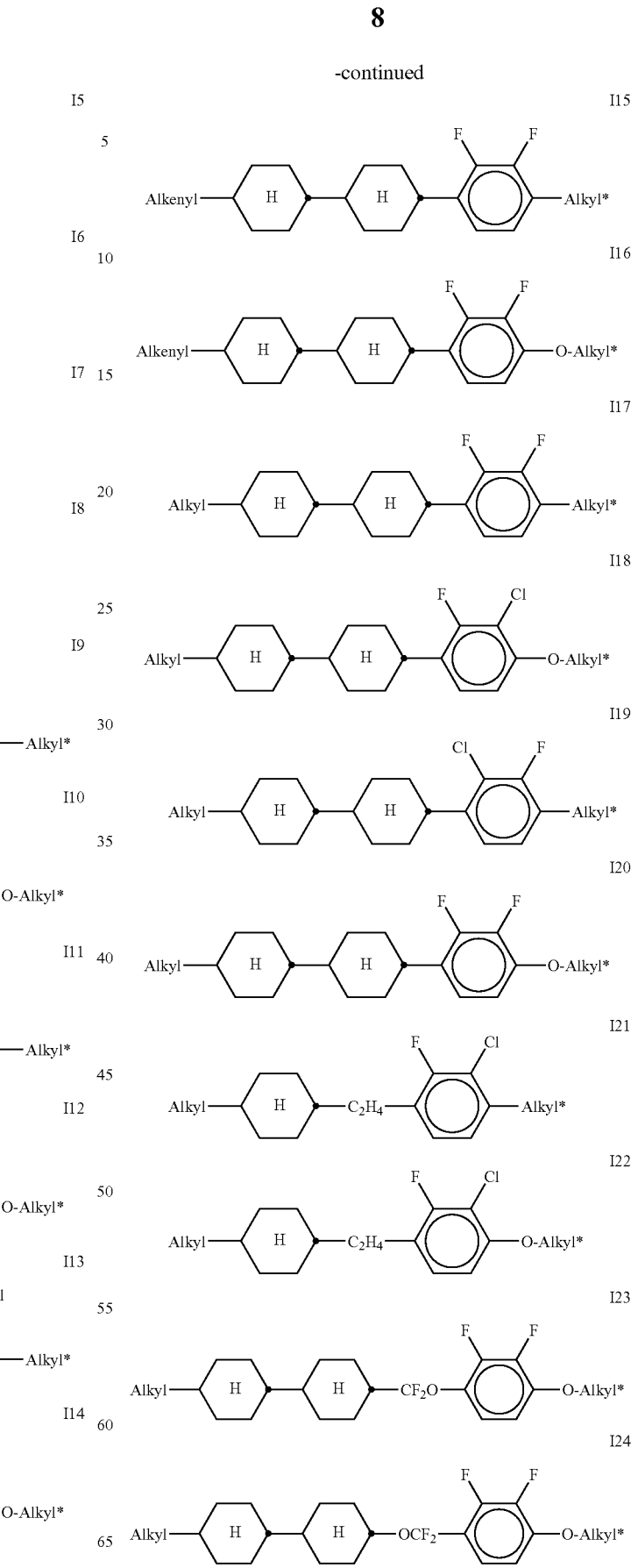

-continued

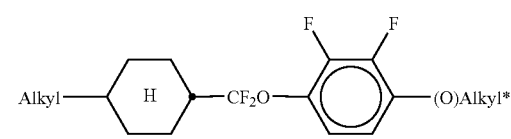
I25

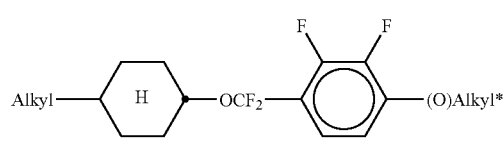
I25

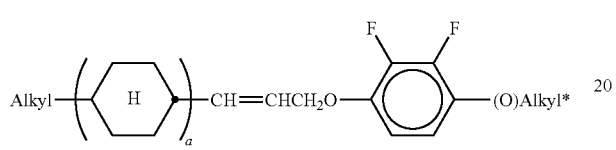
I26

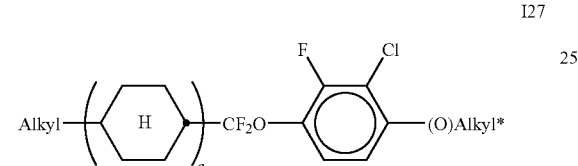
I27

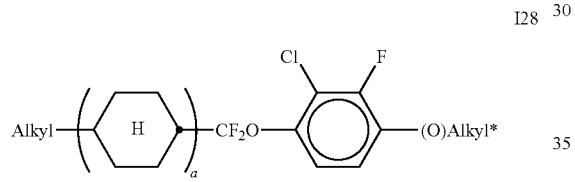
I28 wherein a is 1 or 2, Alkyl and Alkyl* are independently of each other straight chain alkyl having from 1 to 6 C-atoms, (O) in (O)Alkyl* means that an —O— group is optionally present (i.e., (O)Alkyl* means —O—Alkyl* or Alkyl*), and Alkenyl is straight chain alkenyl having from 2 to 6 C-atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds of the subformulae I1, I2, I9 and I10.

The compounds of the formula II are preferably selected from the following subformulae:

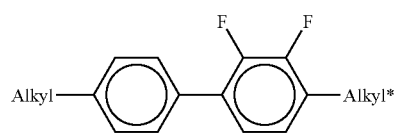
II1

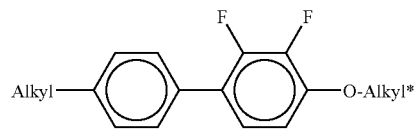
II2

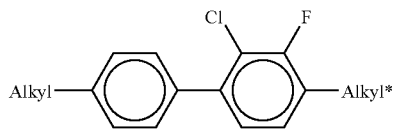
II3

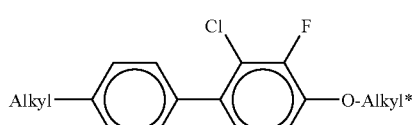
II4

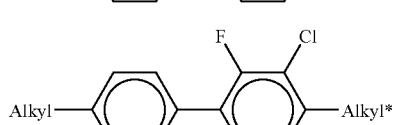
II5

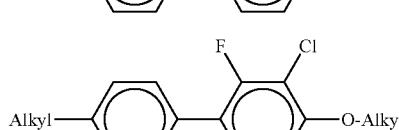
II6

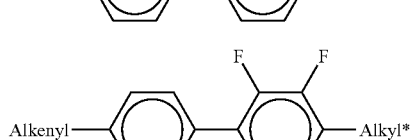
II7

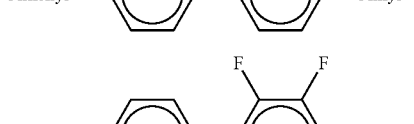
II8

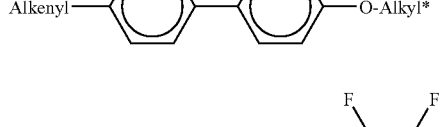
II9

II10

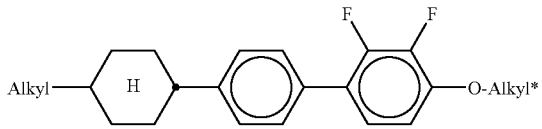
II11

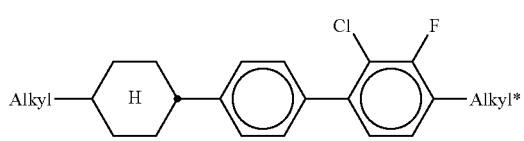
II12

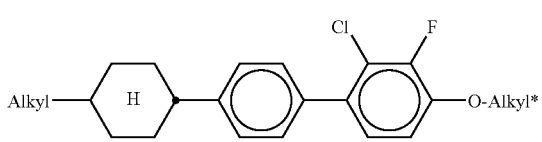
II13

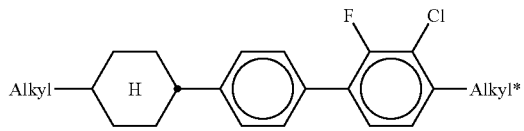

-continued

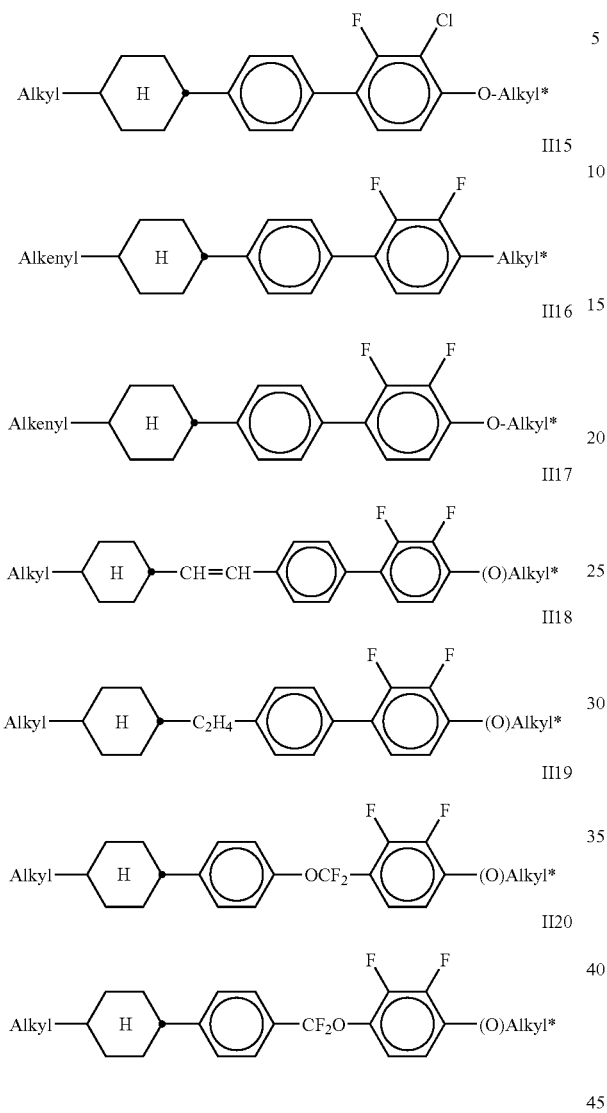

wherein Alkyl and Alkyl* are independently of each other straight chain alkyl having from 1 to 6 C-atoms, (O) in (O)Alkyl* means that an —O— group is optionally present, and Alkenyl is straight chain alkenyl having from 2 to 6 C-atoms. Alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Especially preferred are compounds of the subformulae II1, II2, II9 and II10.

Further preferred compounds of the formula II are those wherein $Z^1$ is —C≡C—, especially those selected from the following subformulae:

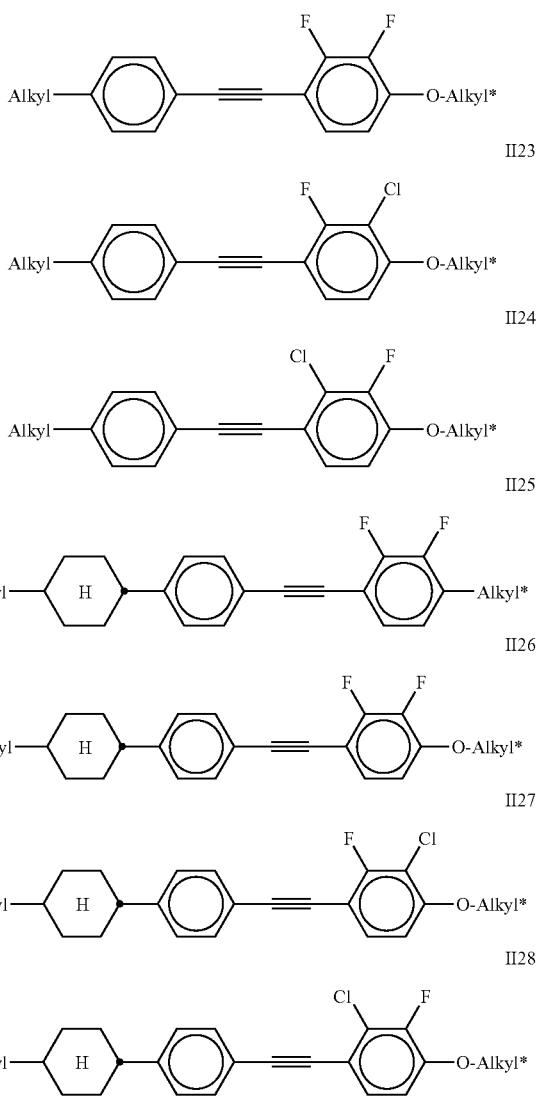

wherein Alkyl and Alkyl* are as defined above.

Further preferred is an LC medium wherein the nematic component additionally comprises one or more compounds of formula III

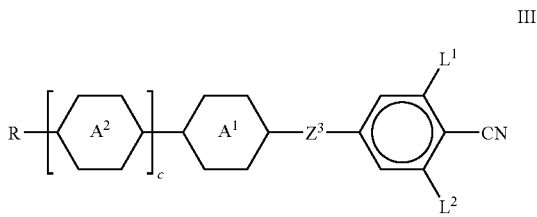

in which
c is 0 or 1,
R has one of the meanings indicated for $R^1$ in the formula I,

and

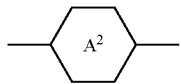

are each, independently of one another,

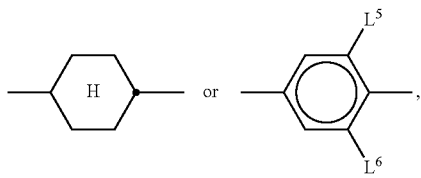

$L^1$ to $L^6$ are each, independently of one another, H or F, and $Z^3$ is —COO— or, if at least one of the radicals $A^1$ and $A^2$ is trans-1,4-cyclohexylene, is alternatively —CH$_2$CH$_2$— or a single bond.

The compounds of the formula III are preferably selected from the following subformulae:

IIIa

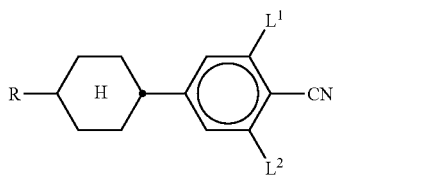

IIIb

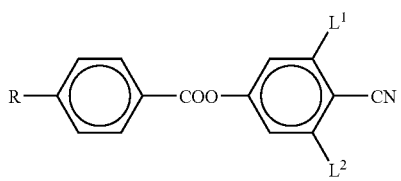

IIIc

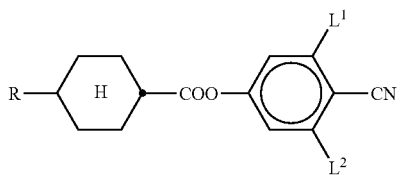

IIId

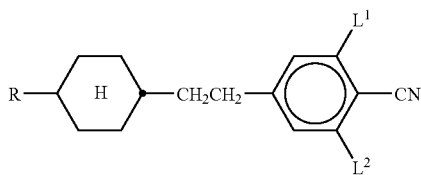

IIIe

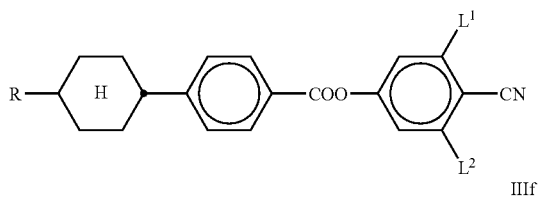

IIIf

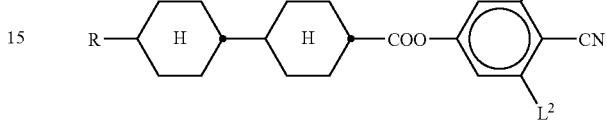

in which R is as defined in the formula III, and $L^1$ and $L^2$ are each, independently of one another, H or F. R in these compounds is particularly preferably alkyl or alkoxy having from 1 to 8 carbon atoms.

Particular preference is given to mixtures which comprise one or more compounds of formula IIIa, IIIb or IIIe, in particular those in which $L^1$ and/or $L^2$ are F.

Preference is furthermore given to mixtures which comprise one or more compounds of formula IIIf in which $L^2$ is H and $L^1$ is H or F, in particular F.

Further preferred is an LC medium wherein the nematic component additionally comprises one or more compounds selected from the following formulae:

IV1

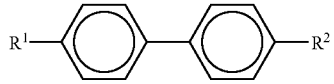

IV2

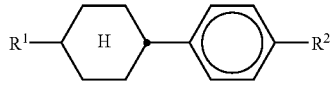

IV3

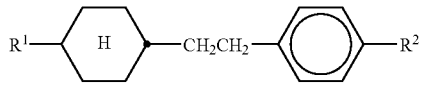

IV4

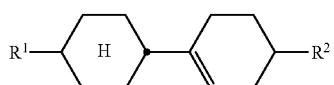

IV5

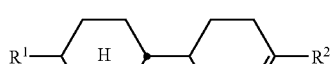

IV6

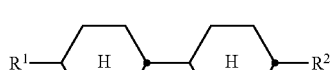

IV7

IV8

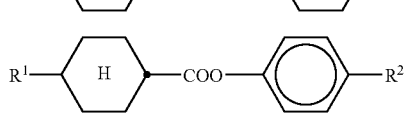

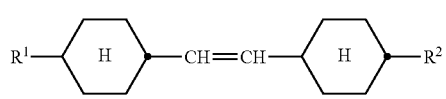

IV9 and/or one or more compounds selected from the tricyclic compounds of the following formulae:

IV10

IV11

IV12

IV13

IV14

IV15

IV16

IV17

IV18

IV19

IV20

IV21

IV22

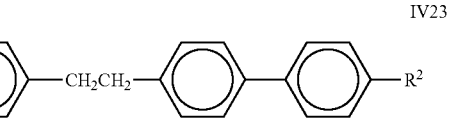

IV23

IV24

IV25

IV26 and/or one or more compounds selected from the tetracyclic compounds of the following formulae:

IV27

IV28

IV29

IV30

IV31

IV32

IV33 in which $R^1$ and $R^2$ each, independently of one another, have one of the meanings indicated for $R^1$ in the formula I and are preferably each, independently of one another, an alkyl, alkoxy or alkenyl group having from 1 to 12 carbon atoms, in which, in addition, one or two non-adjacent CH$_2$ groups may be replaced by —O—, —CH═CH—, —C≡C—, —CO—, —OCO— or —COO— in such a way that O atoms are not linked directly to one another, and L$^1$ is H or F.

The 1,4-phenylene groups in IV10 to IV19 and IV23 to IV26 may each, independently of one another, also be mono- or polysubstituted by fluorine.

Particular preference is given to compounds of the formulae IV27 to IV33 in which R$^1$ is alkyl and R$^2$ is alkyl or alkoxy, each having from 1 to 7 carbon atoms. Preference is furthermore given to compounds of the formulae IV25 and IV31 in which L$^1$ is F. Very particular preference is given to compounds of the formulae IV6, IV26, IV27 and IV32.

R$^1$ and R$^2$ in the compounds of the formulae IV1 to IV33 are particularly preferably straight-chain alkyl or alkoxy having from 1 to 12 carbon atoms.

Further preferred is an LC medium wherein the nematic component additionally comprises one or more compounds of formula V:

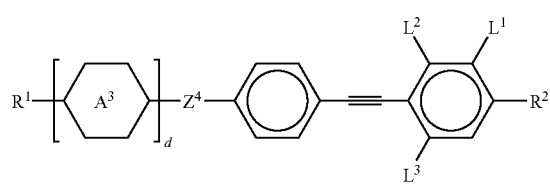

V in which
d is 0 or 1,
R$^1$ and R$^2$ have independently of each other one of the meanings given in formula I,

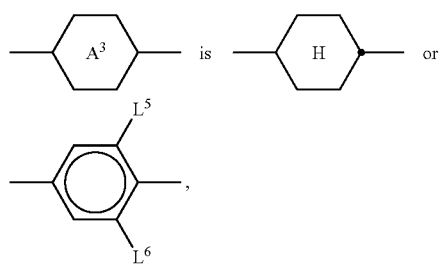

L$^1$ to L$^6$ are each, independently of one another H or F, and Z$^4$ is —COO—, —CH$_2$CH$_2$— or a single bond.

The compounds of the formula V are preferably selected from the following subformulae:

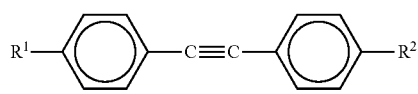

Va

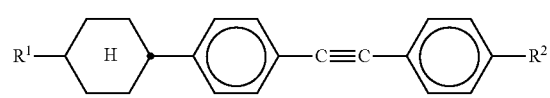

Vb

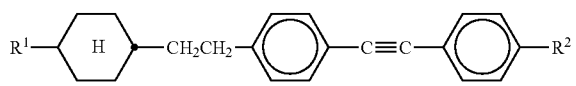

Vc

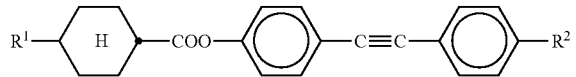

Vd

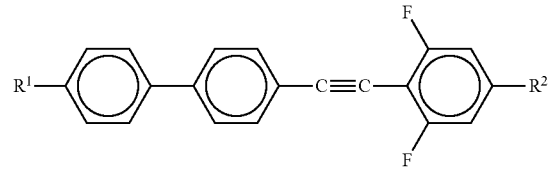

Ve in which R$^1$ and R$^2$ are as defined above. In these compounds, R$^1$ and R$^2$ are particularly preferably alkyl or alkoxy having 1 to 8 carbon atoms.

Particularly preferred are compounds of the formulae Va, Vb and Ve.

Further preferred is an LC medium wherein the nematic component additionally comprises one or more compounds selected from the formulae VI1 and VI2

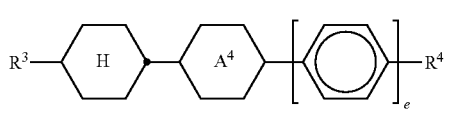

VI1

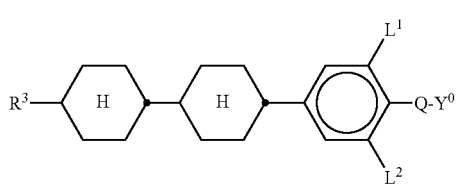

VI2 in which
A$^4$ is 1,4-phenylene or trans-1,4-cyclohexylene,
e is 0 or 1,
R$^3$ is an alkenyl group having from 2 to 7 carbon atoms,
R$^4$ is an alkyl, alkoxy or alkenyl group having from 1 to 12 carbon atoms, in which, in addition, one or two non-adjacent CH$_2$ groups may be replaced by —O—, —CH═CH—, —C≡C—, —CO—, —OCO— or —COO— in such a way that O atoms are not linked directly to one another,
Q is CF$_2$, OCF$_2$, CFH, OCFH or a single bond,
Y$^0$ is F or Cl, and
L$^1$ and L$^2$ are each, independently of one another, H or F.

Particular preference is given to compounds of the formula VI1 in which e is 1. Further preferred compounds of the formula V1 are selected from the following formulae:

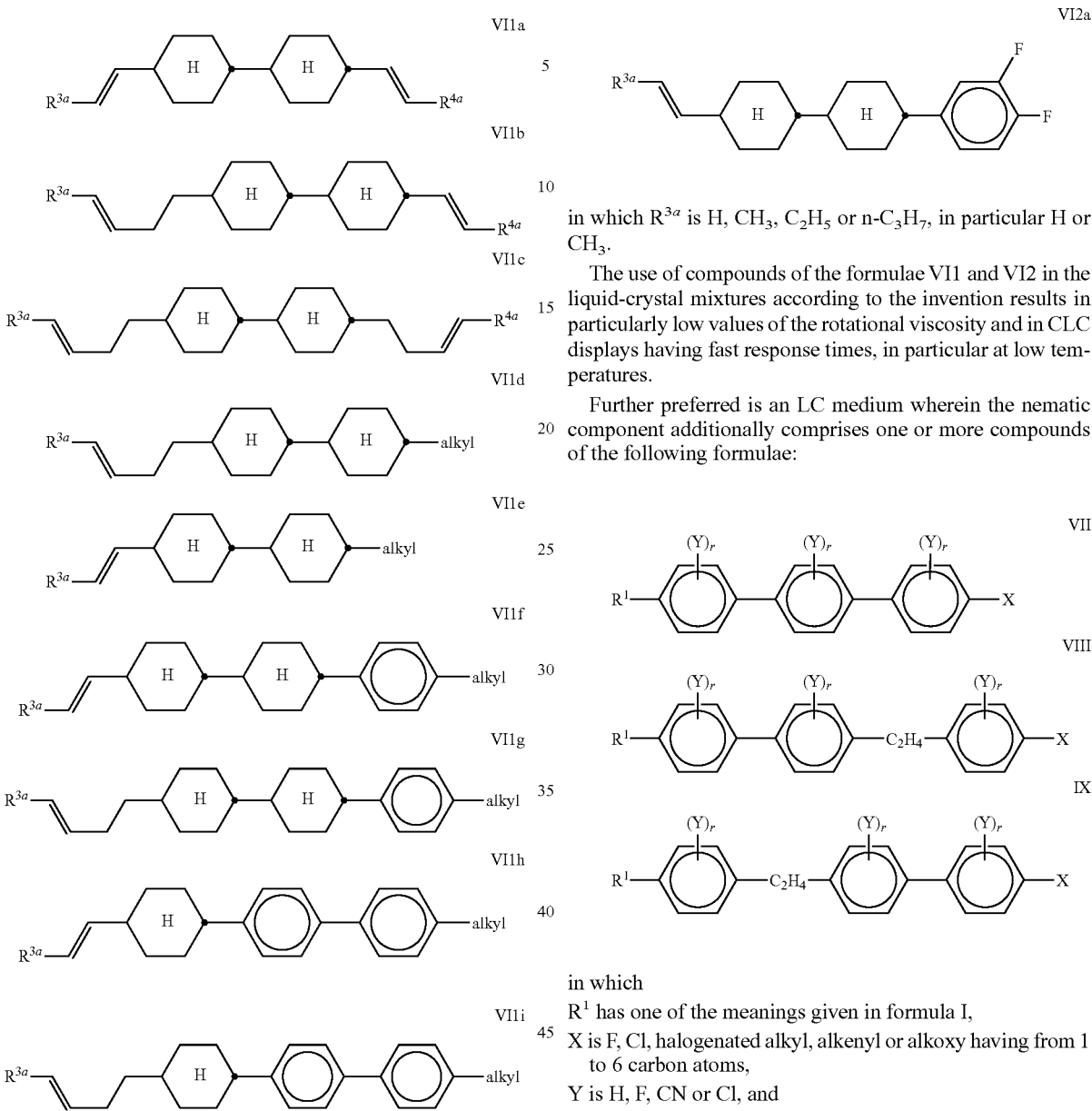

in which $R^{3a}$ and $R^{4a}$ are each, independently of one another, H, $CH_3$, $C_2H_5$ or n-$C_3H_7$, and alkyl is an alkyl group having from 1 to 8 carbon atoms.

Particular preference is given to compounds of the formula VI1a, in particular those in which $R^{3a}$ and $R^{4a}$ are $CH_3$, compounds of the formula VI1e, in particular those in which $R^{3a}$ is H, and compounds of the formulae VI1f, VI1g, VI1h and VI1i, in particular those in which $R^{3a}$ is H or $CH_3$.

Particularly preferred compounds of the formula VI2 are those in which $L^1$ and/or $L^2$ are F, and Q-Y is F or $OCF_3$. Further preferred compounds of the formula VI2 are those in which $R^3$ is 1E-alkenyl or 3E-alkenyl having from 2 to 7 carbon atoms, in particular 2, 3 or 4 carbon atoms. Further preferred compounds of the formula VI2 are those of the formula VI2a

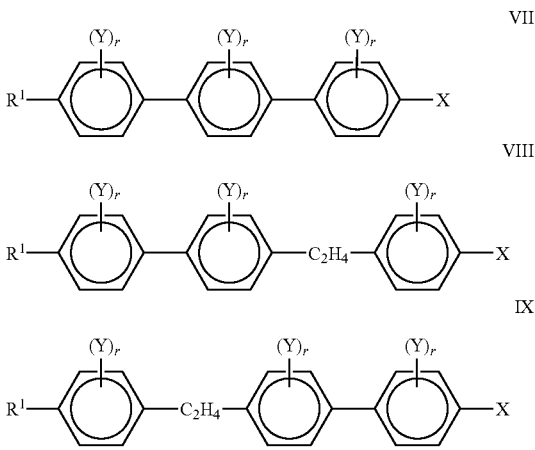

in which $R^{3a}$ is H, $CH_3$, $C_2H_5$ or n-$C_3H_7$, in particular H or $CH_3$.

The use of compounds of the formulae VI1 and VI2 in the liquid-crystal mixtures according to the invention results in particularly low values of the rotational viscosity and in CLC displays having fast response times, in particular at low temperatures.

Further preferred is an LC medium wherein the nematic component additionally comprises one or more compounds of the following formulae:

in which
$R^1$ has one of the meanings given in formula I,
X is F, Cl, halogenated alkyl, alkenyl or alkoxy having from 1 to 6 carbon atoms,
Y is H, F, CN or Cl, and
r is 0, 1, 2, 3 or 4, and The 1,4-phenylene rings are preferably monosubstituted or poly-substituted by fluorine atoms.

The compounds of formulae VII-IX are particularly preferably of the following subformulae:

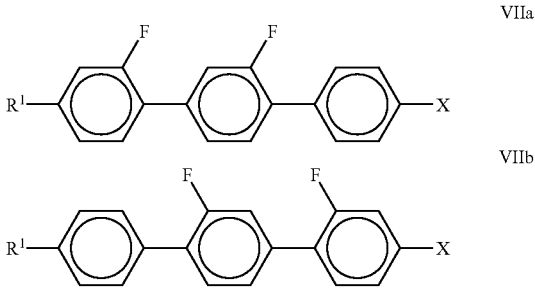

-continued

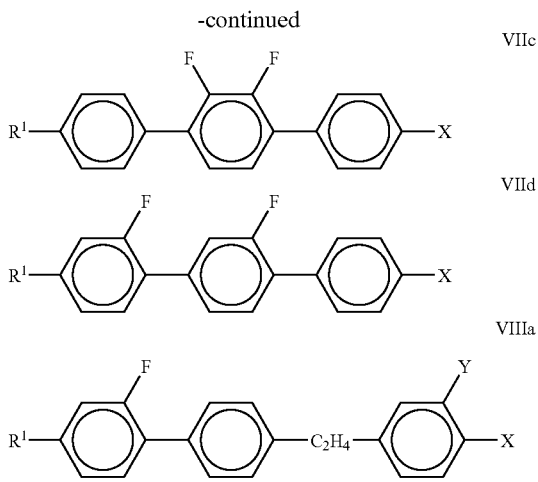

in which $R^1$ and X are as defined above, Y is H or F, preferably F, $R^1$ is particularly preferably n-alkyl having from 1 to 8 carbon atoms or alkenyl having from 2 to 7 carbon atoms, and X in the formulae VIIa, VIIb and VIIIa is preferably F or Cl and in the formulae VIIc and VIId is preferably alkyl or alkoxy having from 1 to 6 carbon atoms.

Further preferred is an LC medium wherein the nematic component additionally comprises one or more compounds of formula XVIII

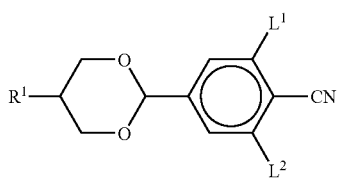

wherein $R^1$, $L^1$ and $L^2$ are as defined in formula I. Preferably $L^1$ and $L^2$ are H or F, most preferably one or both of $L^1$ and $L^2$ denotes F.

The compounds of formula XVIII are preferably selected from the following formulae:

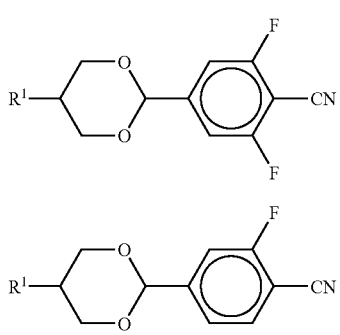

in which $R^1$ is as defined in formula XVIII and is particularly preferably n-alkyl having from 1 to 8 carbon atoms or alkenyl having from 2 to 7 carbon atoms. Very preferred are compounds of formula XVIIIa.

In particularly preferred embodiments, the nematic component comprises
one or more compounds selected from the formulae I1, I2, I9 and I10,
one or more compounds selected from the formulae II1, II2, II9 and II10,
one or more compounds selected from the formulae IIIa, IIIb and IIIe,
one or more compounds of the formula Ve,
one or more compounds of formula XVIII, very preferably of formula XVIIIa,
one or more compounds of formula II22 and/or II26,
from 1 to 20, in particular from 1 to 15, compounds of the formula I and/or II,
from 1 to 10, in particular from 1 to 6, compounds of the formula III,
from 1 to 10, in particular from 1 to 4, compounds of the formula V,
from 1 to 4, in particular 1 or 2, compounds of the formula XVIII,
more than 40%, preferably more than 50%, very preferably from 40 to 90%, most preferably from 50 to 90% of one or more compounds of the formula I and/or II,
from 10 to 50%, preferably from 15 to 40%, of compounds of the formula I,
from 10 to 60%, preferably from 15 to 50%, of compounds of the formula II,
from 5 to 40%, preferably from 15 to 35%, of compounds of the formula III,
from 10 to 40%, preferably from 15 to 35%, of compounds of the formula V,
from 2 to 30%, preferably from 3 to 15%, of compounds of formula XVIII,
from 2 to 40%, preferably from 5 to 30%, of compounds of formula II22 and/or II26.

In a further particularly preferred embodiment, the nematic component essentially consists of compounds selected from the formulae I2, I10, II10, IIIb, IIIe and Ve, and optionally formula XVIII and/or II22 and/or II26.

The dielectric anisotropy $\Delta \in$ of the nematic component is preferably $\geq 10$, in particular $\geq 15$. The value of $\in_\perp$ of the nematic component is preferably from 3 to 15, more preferably >7, in particular >8, most preferably $\geq 9$.

The birefringence $\Delta n$ of the nematic component is preferably $\geq 0.15$, very preferably $\geq 0.20$, and preferably $\leq 0.3$, in particular between 0.15 and 0.3, most preferably between 0.17 and 0.26.

The clearing point of the nematic component is preferably >70° C., very preferably >85° C.

In a preferred embodiment the nematic component has a value of $\in_\perp \geq 6$, preferably $\geq 7$, very preferably $\geq 8$, most preferably $\geq 9$.

Through a suitable choice of the terminal radicals R and $R^{1-4}$ in the compounds of the formulae I to V, the addressing times, the threshold voltage and further properties can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $K_3$ (bend) and $K_1$ (splay) compared with alkyl or alkoxy radicals. 4-Alkenyl radicals, 3-alkenyl radicals and the like generally give lower threshold voltages and smaller values of $K_3/K_1$ compared with alkyl and alkoxy radicals.

A —$CH_2CH_2$— group in the bridging members $Z^{1-4}$ generally results in higher values of the ratio of the elastic constants $K_3/K_1$ compared with a single covalent bond. Higher values of $K_3/K_1$ facilitate, for example, a shorter reflection wavelength without a change in the dopant concentration owing to the higher HTP.

The optimum mixing ratio of the individual compounds of the formulae I to V depends substantially on the desired properties, on the choice of the compounds of the formulae I to V and on the choice of further components optionally present. Suitable mixing ratios within the abovementioned range can easily be determined from case to case.

In the formulae mentioned above and below, the term "fluorinated alkyl or alkoxy having from 1 to 3 carbon atoms" preferably denotes $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$.

The term "alkyl" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Halogen is preferably F or Cl, in particular F.

If one of the above-mentioned radicals is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxy-methyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If one of the above-mentioned radicals is an alkyl radical in which one $CH_2$ group has been replaced by —CH=CH—, this may be straight-chain or branched. It is preferably straight-chain and has from 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If one of the above-mentioned radicals is an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms.

Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If one of the above-mentioned radicals is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above-mentioned radicals is an alkyl or alkenyl radical which is monosubstituted by CN or $CF_3$, this radical is preferably straight-chain. The substitution by CN or $CF_3$ is in any desired position.

If one of the above-mentioned radicals is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups may occasionally be of importance owing to better solubility in the conventional liquid-crystalline base materials. However, they may in particular be suitable as chiral dopants if they are optically active.

Branched groups of this type generally contain not more than one chain branch. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If one of the above-mentioned radicals is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis-(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxy-carbonyl)pentyl.

The optically active component of the CLC media according to the invention comprises one or more chiral dopants whose helical twisting power and concentration are selected in such a way that the helix pitch of the LC medium is less than or equal to 1 μm.

The proportion of optically active component in the CLC media according to the invention is preferably ≦20%, in particular ≦10%, particularly preferably from 0.01 to 7%, very particularly preferably from 0.1 to 5%. The optically active component preferably comprises from 1 to 6, in particular 1, 2, 3 or 4, chiral dopants.

The chiral dopants should preferably have a high helical twisting power (HTP) and low temperature dependence. They should furthermore have good solubility in the nematic component and not impair the liquid-crystalline properties of the LC medium, or only do so to a small extent. They can have the same or opposite directions of rotation and the same or opposite temperature dependence of the twist.

Particular preference is given to chiral dopants having an HTP of 20 $\mu m^{-1}$ or more, in particular 40 $\mu m^{-1}$ or more, particularly preferably 70 $\mu m^{-1}$ or more.

For the optically active component, a multiplicity of chiral dopants, some of which are commercially available, is available to the person skilled in the art, such as, for example, cholesteryl nonanoate, R/S-811, R/S-1011, R/S-2011, R/S-3011 or CB15 (Merck KGaA, Darmstadt).

Particularly suitable dopants are compounds which contain one or more chiral radicals and one or more mesogenic groups or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore monovalent or polyvalent chiral radicals selected from sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide and isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or -propylene glycols in which one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE-A-43 42 280, EP-A-1038 941 and DE-A-195 41 820.

Particular preference is given to chiral dopants of the following formulae:

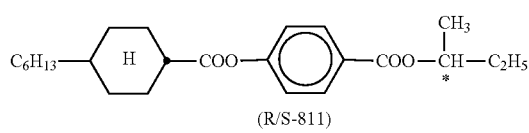

(R/S-811)

X

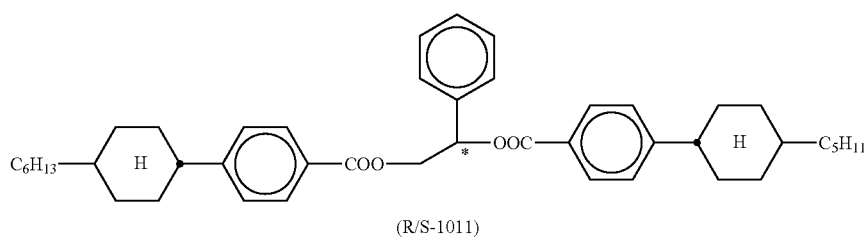

(R/S-1011)

XI

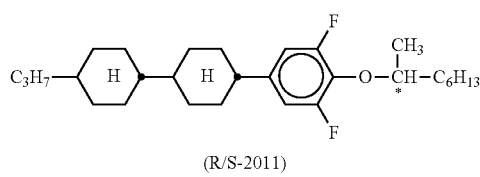

(R/S-2011)

XII

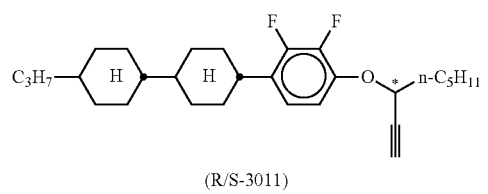

(R/S-3011)

XIII

-continued

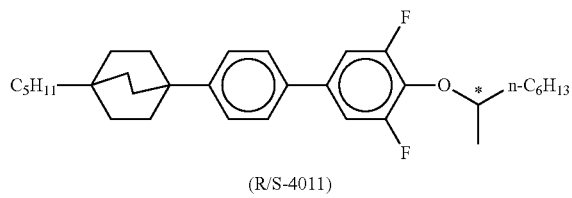

(R/S-4011)

Further preferred chiral dopants are derivatives of isosorbide, isomannitol or isoiditol of the following formula:

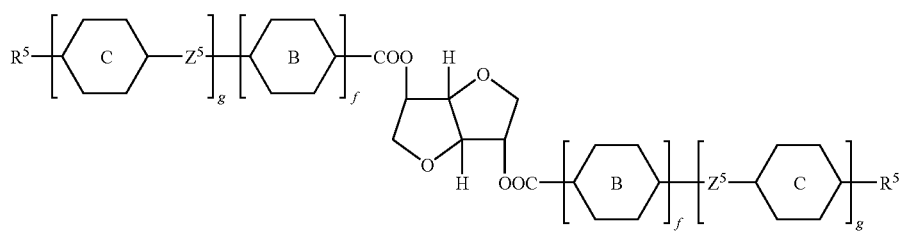

XV in which the group

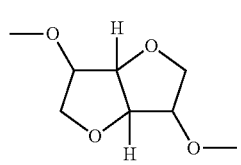

(dianhydrosorbitol)

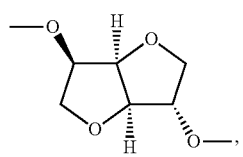

(dianhydrosorbitol)

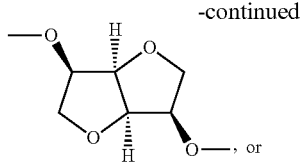

(dianhydromannitol)

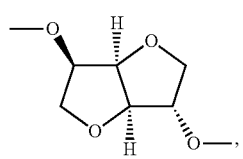

(dianhydroiditol)

is preferably dianhydrosorbitol,
and chiral ethanediols, such as, for example, diphenylethanediol (hydrobenzoin), in particular mesogenic hydrobenzoin derivatives of the formula

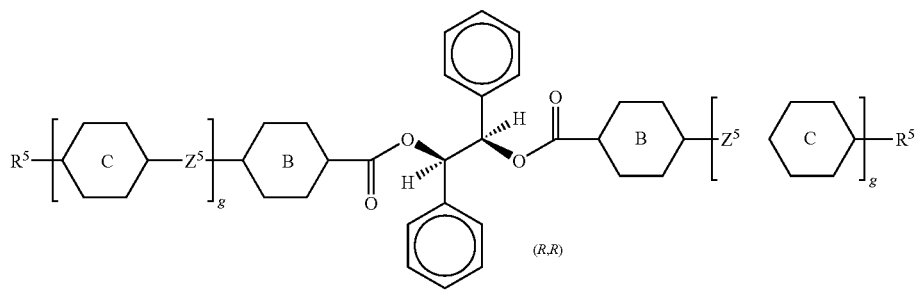

XVI (R,R)

including the (R,S), (S,R), (R,R) and (S,S) enantiomers, none of which are shown, in which B and C are each, independently of one another, 1,4-phenylene, which may also be monosubstituted, disubstituted or trisubstituted by L, or 1,4-cyclohexylene, L is H, F, Cl, CN or optionally halogenated alkyl having 1-7 carbon atoms, alkoxy having 1-7 carbon atoms, alkylcarbonyl having up to 7 carbon atoms, alkoxycarbonyl having up to 7 carbon atoms, alkylcarbonyloxy having up to 7 carbon atoms, or alkoxycarbonyloxy having up to 7 carbon atoms, f is 0, 1 or 2, g is 0 or 1, $Z^5$ is —COO—, —OCO—, —CH$_2$CH$_2$— or a single bond, and $R^5$ is alkyl having 1-12 carbon atoms, alkoxy having 1-12 carbon atoms, alkylcarbonyl having up to 12 carbon atoms, alkoxycarbonyl having up to 12 carbon atoms, or alkylcarbonyloxy having up to 12 carbon atoms.

The compounds of the formula XV are described in WO 98/00428. The compounds of the formula XVI are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants containing at least one fluorinated bridging group and a terminal or central chiral group, as described in WO 02/06196 and WO 02/06195.

Particular preference is given to chiral binaphthyl derivatives of the formula XVII

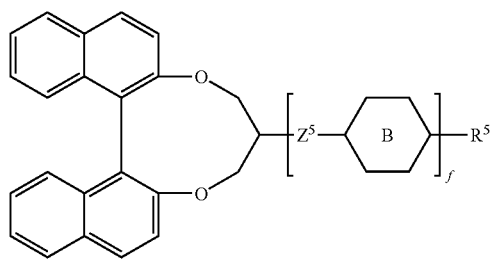

XVII in particular those of the following formulae:

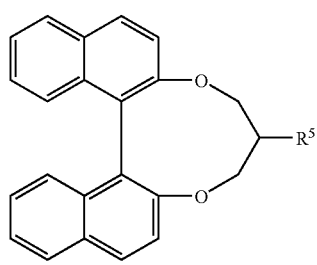

XVIIa

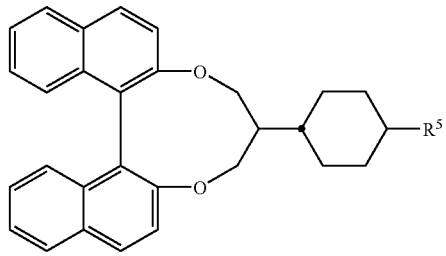

XVIIb

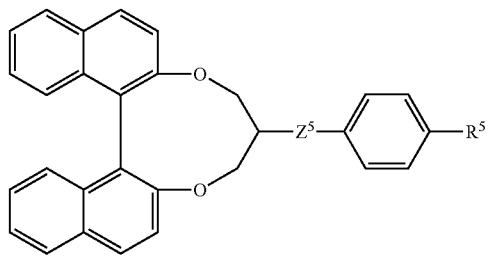

XVIIc in which B, f, $R^5$ and $Z^5$ are as defined in the formula XV, and $Z^5$ is, in particular, —OCO— or a single bond.

The dopants of the following formula:

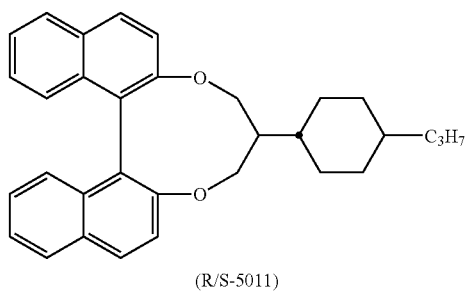

XVIIb1

(R/S-5011)

are particularly preferred.

In particularly preferred embodiments, the optically active component of the media according to the invention comprises one or more dopants selected from the formulae X to XVI, one or more dopants of the formula XVII, not more than one dopant, preferably selected from the formula XVII, preferably in a proportion of less than 8%, in particular less than 5%, of the mixture as a whole (i.e. the sum of the proportions by weight of the nematic and optically active components).

In a further particularly preferred embodiment, the media according to the invention comprise 20% or less, in particular from 0.01 to 10%, of the optically active component.

In particular, the chiral dopants of the above-mentioned formulae XV, XVI and XVII have good solubility in the nematic component and induce a cholesteric structure having high twist and low temperature dependence of the helix pitch and reflection wavelength. Even on use of only one of these dopants in small amounts, it is possible to achieve CLC media according to the invention having reflection colors in the visible wavelength range of high brightness and low temperature dependence which are suitable, in particular, for use in SSCT and PSCT displays. This is an important advantage over the CLC media from the prior art, in which at least two dopants having the same direction of rotation and opposite temperature dependence of the twist are usually required (for example one dopant having positive temperature dependence, i.e. an increase in twist with increasing temperature, and one dopant having negative temperature dependence) in order to achieve temperature compensation of the reflection wavelength. In addition, large amounts of dopants are frequently required in the known CLC media in order to achieve reflection in the visible region.

A particularly preferred embodiment of the invention therefore relates to a CLC medium and to a CLC display containing this medium, as described above and below, in which the chiral component comprises not more than one chiral compound, preferably in an amount of less than 15%, in particular less than 10%, particularly preferably 5% or less. The chiral compound in these media is particularly preferably selected from the compounds described in WO 02/94805, WO 02/34739, WO 02/06265, WO 02/06196 and WO 02/06195 and from the formulae X to XVII, including preferred sub-formulae thereof. A CLC medium of this preferred embodiment has low dependence of the reflection wavelength λ on the temperature T over a broad temperature range.

The helix pitch of the medium is preferably from 130 nm to 1000 nm, in particular from 200 nm to 750 nm, particularly preferably from 300 nm to 450 nm.

The helix pitch is preferably selected in such a way that the medium reflects light in the visible wavelength range. The term "visible wavelength range" or "visible spectrum" typically covers the wavelength range from 400 to 800 nm. Above and below, however, this term is also intended to cover the wavelength range from 200 to 1200 nm, including the UV and infrared (IR) range, and the far UV and far IR range.

The reflection wavelength of the LC medium according to the invention is preferably in the range from 200 to 1500 nm, in particular from 300 to 1200 nm, particularly preferably from 350 to 900 nm, very particularly preferably from 400 to 800 nm. Preference is furthermore given to LC media having a reflection wavelength of from 400 to 700 nm, in particular from 400 to 600 nm.

The wavelength values indicated above and below relate to the half-value width of the reflection band, unless stated otherwise.

Particular preference is given to CLC media according to the invention having a temperature dependence dλ/dT of 0.6 nm/° C. or less, in particular 0.3 nm/° C. or less, very particularly preferably 0.15 nm/° C. or less, preferably in the range between 0 and 50° C., in particular between −20 and 60° C., particularly preferably between −20 and 70° C., very particularly preferably in the range from −20° C. to a temperature of 10° C., in particular 5° C., below the clearing point.

Unless stated otherwise, dλ/dT denotes the local gradient of the function λ(T), where a nonlinear function λ(T) is described to an approximation by a 2nd or 3rd order polynomial.

The invention furthermore relates to the use of the CLC media according to the invention for electro-optical purposes.

The invention furthermore also relates to an electro-optical display containing CLC media according to the invention, in particular an SSCT, PSCT or flexoelectric display having two plane-parallel outer plates which, together with a frame, form a cell, and a cholesteric liquid-crystal mixture located in the cell.

The invention furthermore relates to an electro-optical active-matrix display containing CLC media according to the invention, in particular an AM-CLC display, preferably an AM-SSCT or PSCT display, having two plane-parallel outer plates which, together with a frame, form a cell, integrated non-linear elements for switching individual pixels on the outer plates, and a cholesteric liquid-crystal mixture, which preferably has positive dielectric anisotropy and a high specific resistance, located in the cell.

The construction of bistable SSCT and PSCT cells is described, for example, in WO 92/19695, WO 93/23496, U.S. Pat. No. 5,453,863 or U.S. Pat. No. 5,493,430. The construction of active-matrix CLC displays is described, for example, in WO 02/086855 and US 2002-0149552.

The ratio d/p between the layer thickness of the liquid-crystal cell d (separation of the outer plates) in a CLC display according to the invention and the natural helix pitch p of the CLC medium is preferably greater than 1, in particular in the range from 2 to 20, particularly preferably from 3 to 15, very particularly preferably from 4 to 10.

The CLC media according to the invention facilitate a significant broadening of the available parameter latitude. Thus, the achievable combinations of reflection wavelength, birefringence, clearing point, viscosity, thermal and UV stability and dielectric anisotropy far exceed previous materials from the prior art and make the media according to the invention particularly suitable for use in CLC displays.

The CLC media according to the invention preferably have a cholesteric phase down to −20° C. and preferably down to −30° C., particularly preferably down to −40° C., and clearing points above 70° C., preferably above 90° C.

The width of the cholesteric phase range is preferably at least 90° C., in particular at least 100° C. This range preferably extends at least from −20° to +60° C., particularly preferably at least from −20° to +70° C., very particularly preferably at least from −20° to +80° C.

At the same time, the CLC media according to the invention have low values for the viscosity and high values for the specific resistance, enabling excellent CLC displays, in particular AM-CLC displays, to be achieved. In particular, the mixtures are characterized by low operating voltages.

It goes without saying that a suitable choice of the components of the mixtures according to the invention also enables higher clearing points (for example above 120° C.) to be achieved at higher threshold voltages or lower clearing points to be achieved at lower threshold voltages while retaining the other advantageous properties. Mixtures having greater $\Delta\epsilon$ and thus lower thresholds can likewise be obtained with viscosities correspondingly increased only slightly.

The UV stability of the CLC media according to the invention is also considerably better, i.e. they exhibit a significantly smaller change in the reflection wavelength and operating voltage on UV exposure.

A further preferred embodiment of the present invention relates to a CLC medium according to the invention which comprises one or more compounds containing at least one polymerizable group. CLC media of this type are particularly suitable for use, for example, in polymer gel or PSCT displays. The polymerizable compounds may be a constituent of the nematic and/or chiral component or form an additional component of the medium.

Suitable polymerizable compounds are known to the person skilled in the art and are described in the prior art. The polymerizable compounds may additionally also be mesogenic or liquid-crystalline. They may contain one or more, preferably two, polymerizable groups. Typical examples of non-mesogenic compounds containing two polymerizable groups are alkyl diacrylates or alkyl dimethacrylates containing alkyl groups having from 1 to 20 carbon atoms. Typical examples of non-mesogenic compounds containing more than two polymerizable groups are trimethylolpropane trimethacrylate and pentaerythritol tetraacrylate. Typical examples of mesogenic polymerizable compounds, also known as "reactive mesogens" (RMs) are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107 and U.S. Pat. No. 6,514,578. Examples of particularly suitable and preferred RMs are shown in the following list:

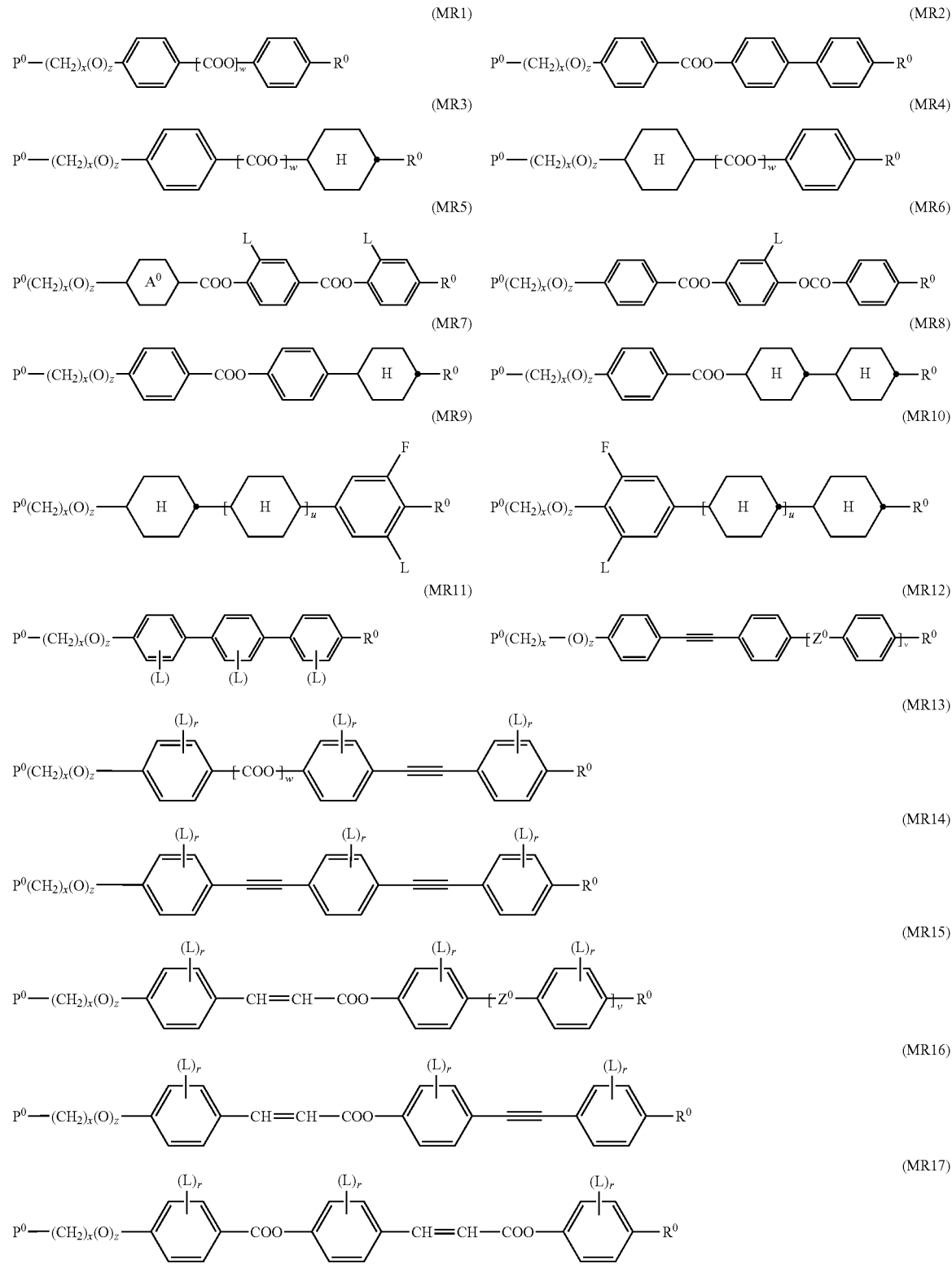

-continued (MR18), (MR19), (MR20), (MR21), (MR22), (MR23), (MR24), (MR25), (MR26), (MR27), (DR1), (DR2), (DR3), (DR4), (DR5), (DR6)

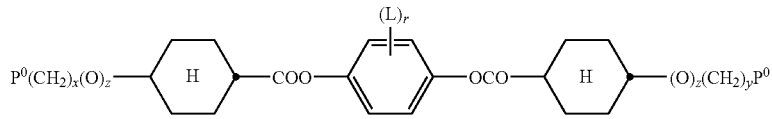
(DR7)
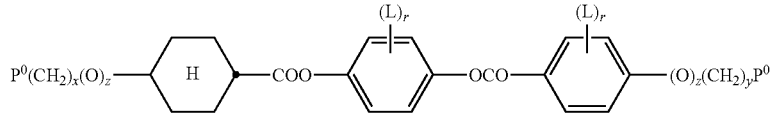
(DR8)
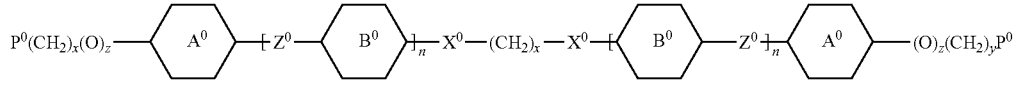
(DR9)
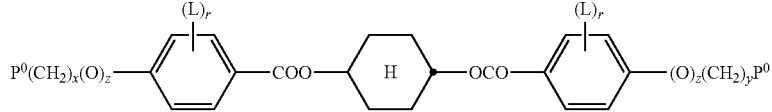
(DR10)
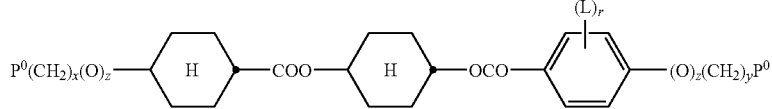
(DR11)
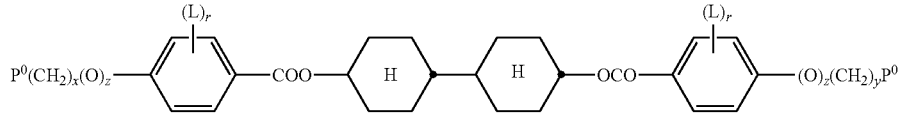
(DR12)
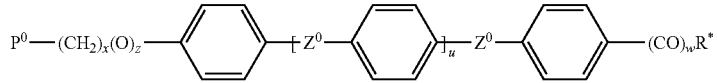
(CR1)
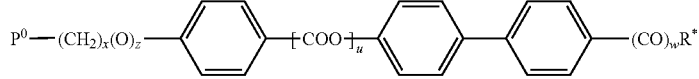
(CR2)
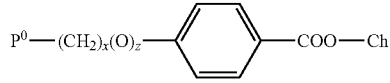
(CR3)
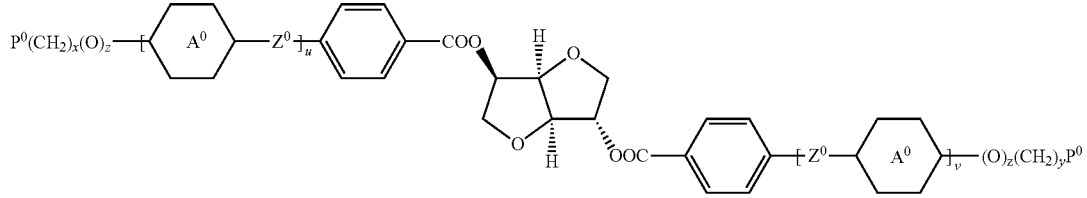
(CR4)
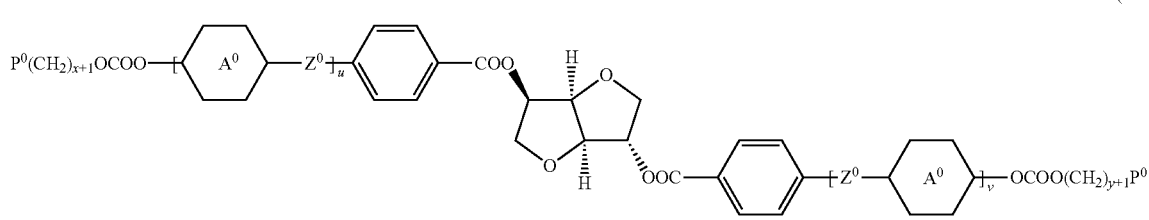
(CR5)

-continued

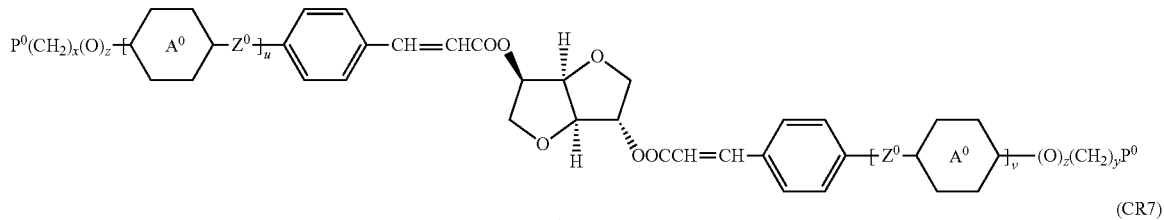
(CR6)

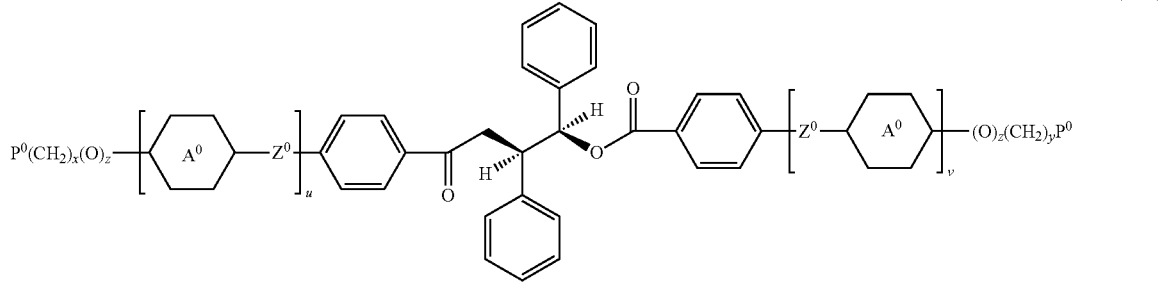
(CR7)

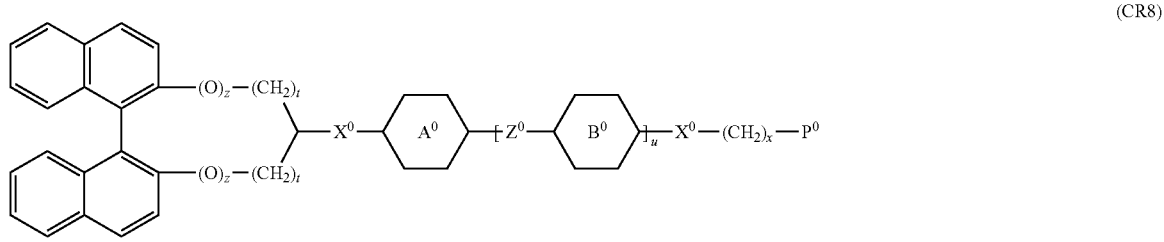
(CR8)

wherein
$P^0$ is, in case of multiple occurrence independently of one another, a polymerizable group, preferably an acryl, methacryl, oxetane, epoxy, vinyl, vinyloxy, propenyl ether or styrene group,
$A^0$ and $B^0$ are, in case of multiple occurrence independently of one another, 1,4-phenylene that is optionally substituted with 1, 2, 3 or 4 groups L, or trans-1,4-cyclohexylene,
$Z^0$ is, in case of multiple occurrence independently of one another, —COO—, —OCO—, —CH$_2$CH$_2$—, —C≡C—, —CH=CH—, —CH=CH—COO—, —OCO— CH=CH— or a single bond,
$R^0$ is alkyl, alkoxy, thioalkyl, alkylcarbonyl, alkoxycarbonyl, alkylcarbonyloxy or alkoxycarbonyloxy, wherein the alkyl or alkoxy contains with 1 or more C atoms, preferably 1 to 15 C atoms, and which is optionally fluorinated, or is $Y^0$ or $P-(CH_2)_y-(O)_z-$,
$Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with up to 4 C atoms, or mono- oligo- or polyfluorinated alkyl or alkoxy with 1 to 4 C atoms,
$R^{01,02}$ are independently of each other H, $R^0$ or $Y^0$,
R* is a chiral alkyl or alkoxy group with 4 or more, preferably 4 to 12 C atoms, like 2-methylbutyl, 2-methyloctyl, 2-methylbutoxy or 2-methyloctoxy,
Ch is a chiral group selected from cholesteryl, estradiol, or terpenoid radicals like menthyl or citronellyl,
L is, in case of multiple occurrence independently of one another, H, F, Cl, CN or optionally halogenated alkyl, alkoxy, alkylcarbonyl, alkoxycarbonyl, alkylcarbonyloxy, or alkoxycarbonyloxy with up to 5 C atoms,
r is 0, 1, 2, 3 or 4,
t is, in case of multiple occurrence independently of one another, 0, 1, 2 or 3,
u and v are independently of each other 0, 1 or 2,
w is 0 or 1,
x and y are independently of each other 0 or identical or different integers from 1 to 12,
z is 0 or 1, with z being 0 if the adjacent x or y is 0, and wherein the benzene and napthalene rings can additionally be substituted with one or more identical or different groups L.

The CLC medium comprising one or more polymerizable compounds may additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, dyes, pigments or nanoparticles.

The individual compounds of the formulae above and below and the sub-formulae thereof which can be used in the media according to the invention are either known or they can be prepared analogously to the known compounds.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation.

The liquid-crystal mixtures according to the invention may also comprise further additives, such as, for example, one or more stabilizers or antioxidants.
The following abbreviations are used (wherein n, m and z are independently of each other 1, 2, 3, 4, 5 or 6):
TABLE A
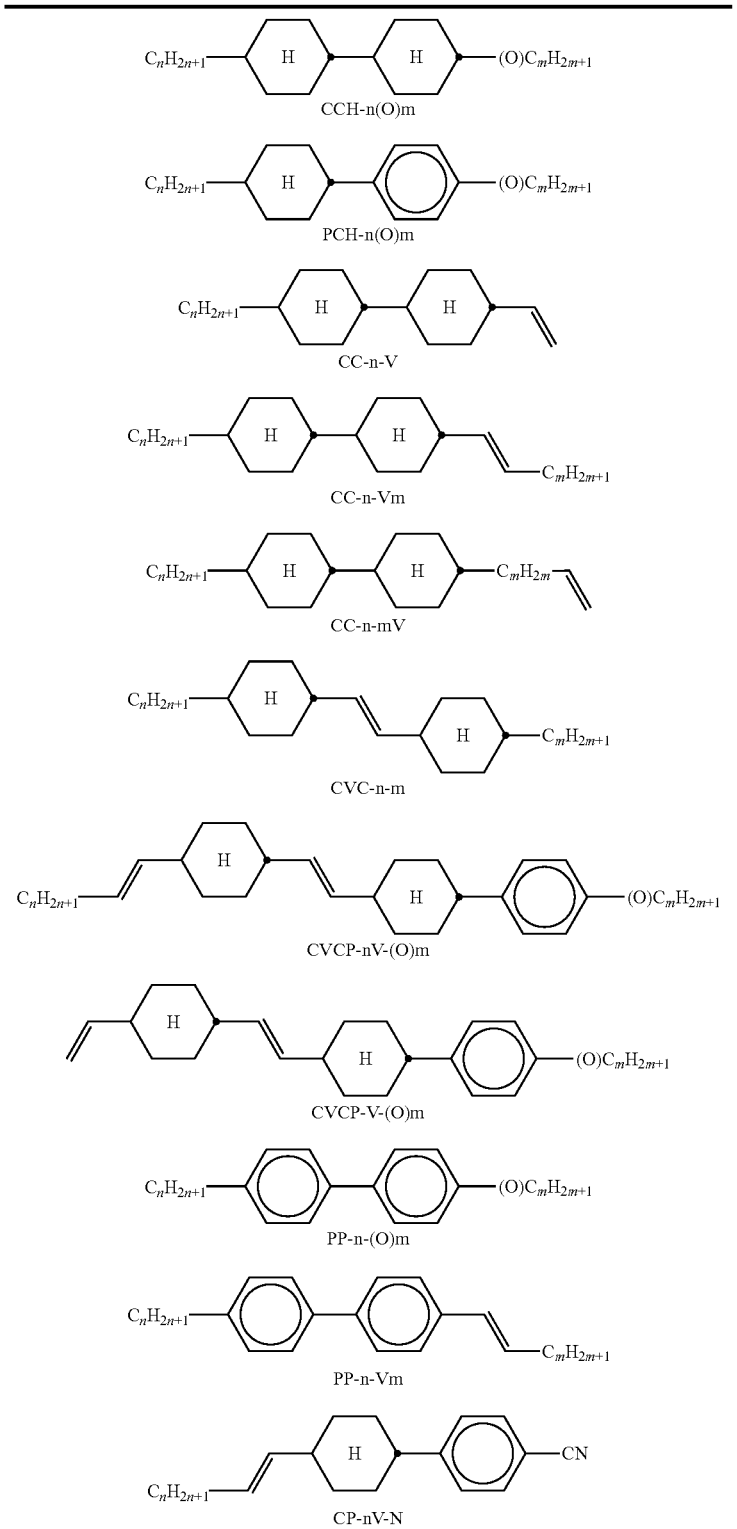

TABLE A-continued
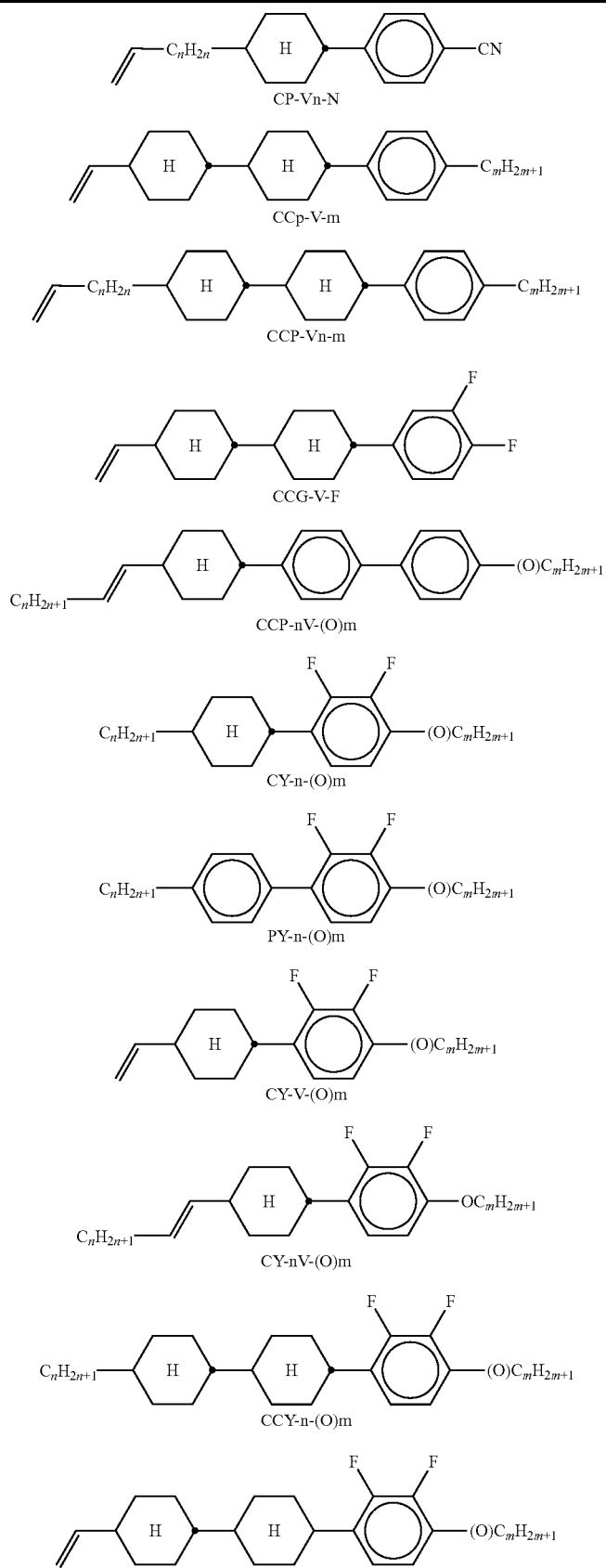

TABLE A-continued
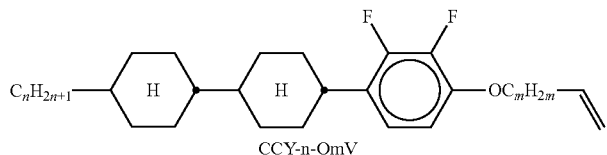
CCY-V-(O)m
CCY-n-OmV
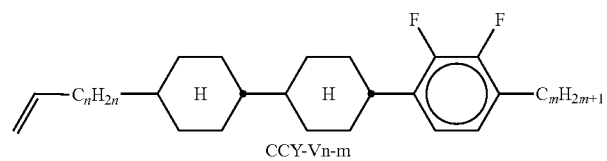
CCY-Vn-m
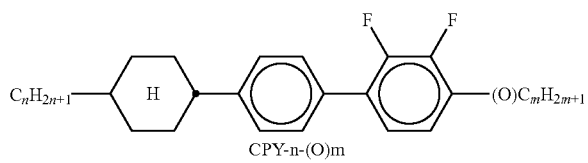
CPY-n-(O)m
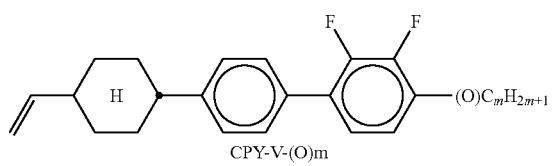
CPY-V-(O)m
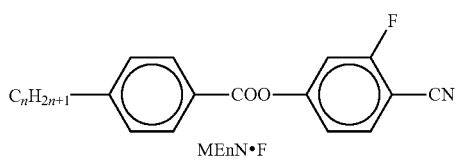
MEnN•F
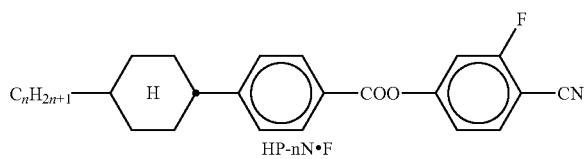
HP-nN•F
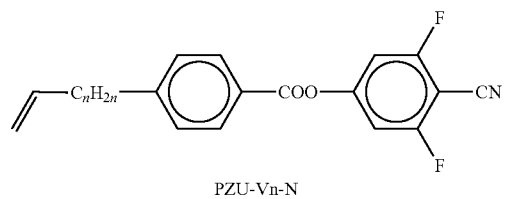
PZU-Vn-N
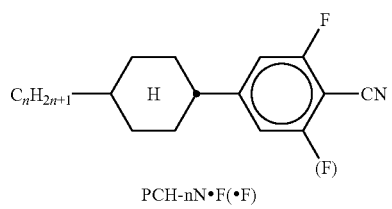
PCH-nN•F(•F)
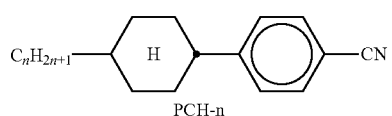
PCH-n TABLE A-continued
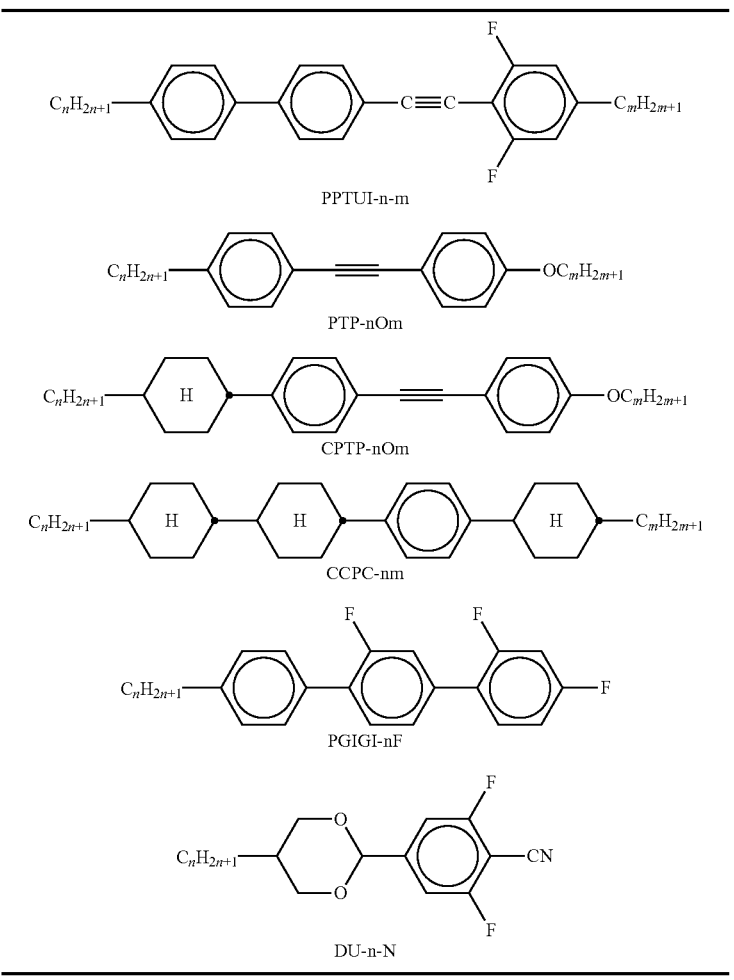
In a preferred embodiment of the present invention the LC medium comprises one or more compounds selected from the compounds of table A.
TABLE B
Table B shows suitable chiral dopants that are optionally added to the LC media according to the present invention.
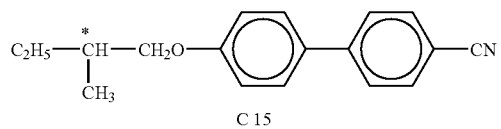
C 15
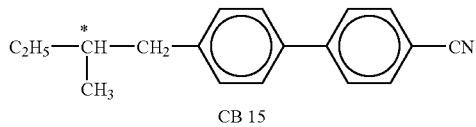
CB 15
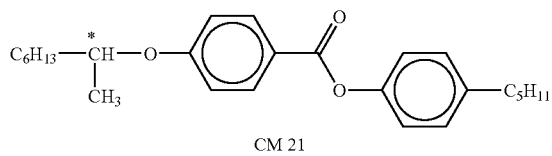
CM 21

TABLE B-continued
Table B shows suitable chiral dopants that are optionally added to
the LC media according to the present invention.
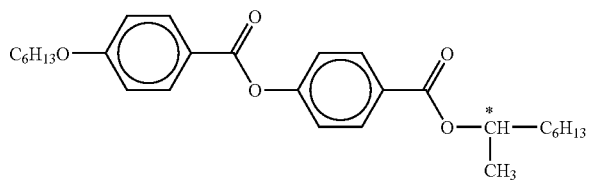
R/S-811
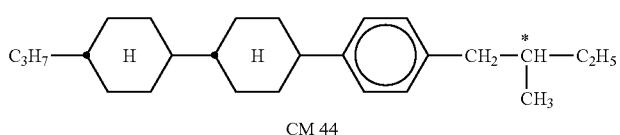
CM 44
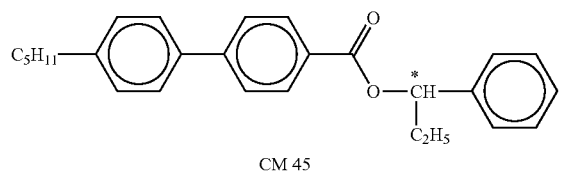
CM 45
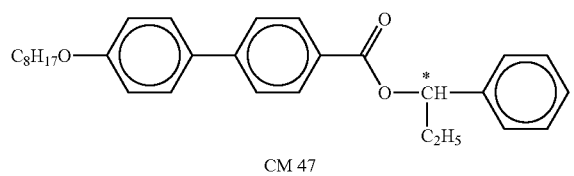
CM 47
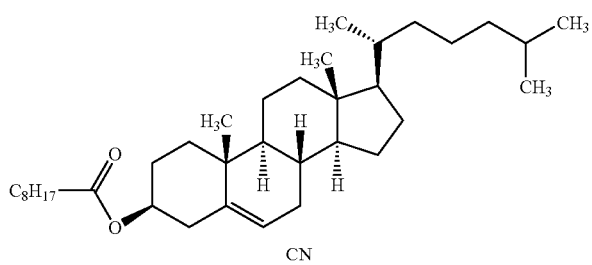
CN
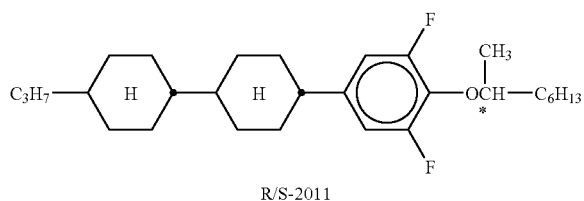
R/S-2011
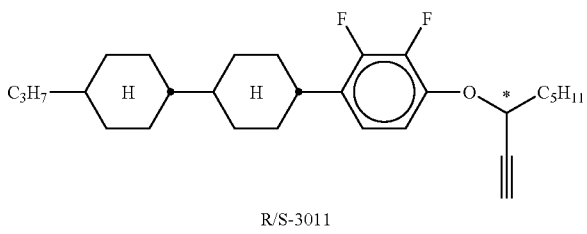
R/S-3011

TABLE B-continued
Table B shows suitable chiral dopants that are optionally added to the LC media according to the present invention.
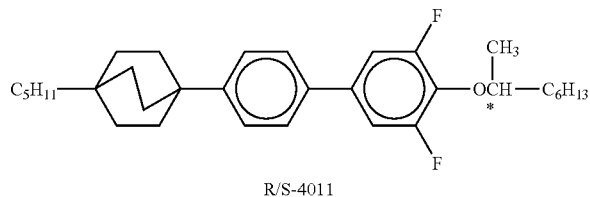
R/S-4011
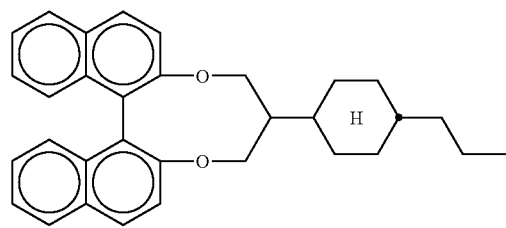
R/S-5011
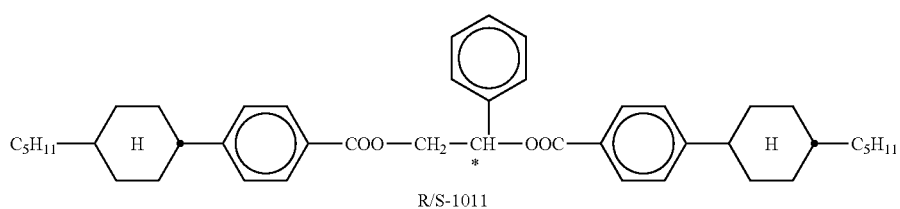
R/S-1011
TABLE C
Table C shows suitable stabilizers that are optionally added to the LC media according to the present invention (wherein n is an integer from 1 to 12).
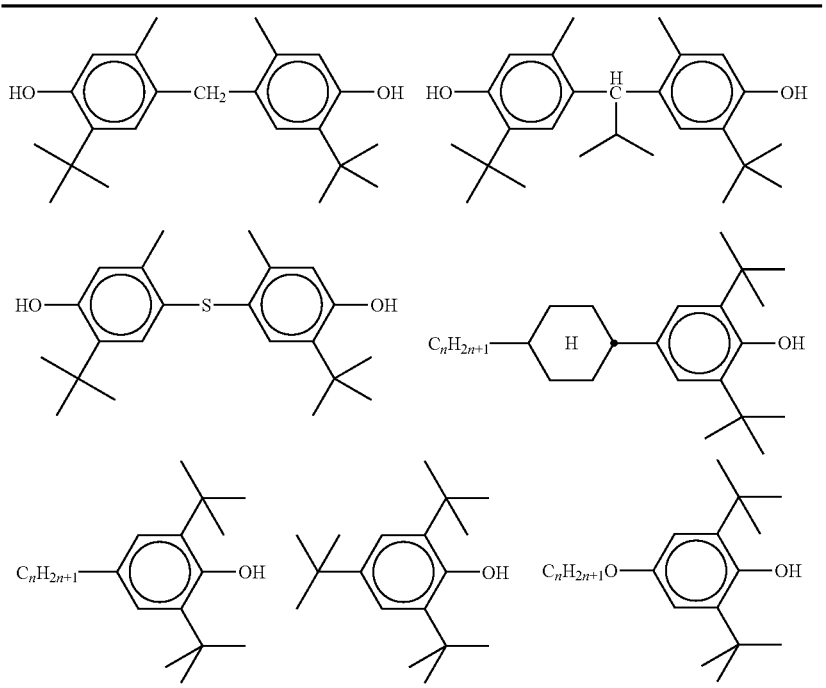

TABLE C-continued
Table C shows suitable stabilizers that are optionally added to the
LC media according to the present invention (wherein n is an integer from
1 to 12).
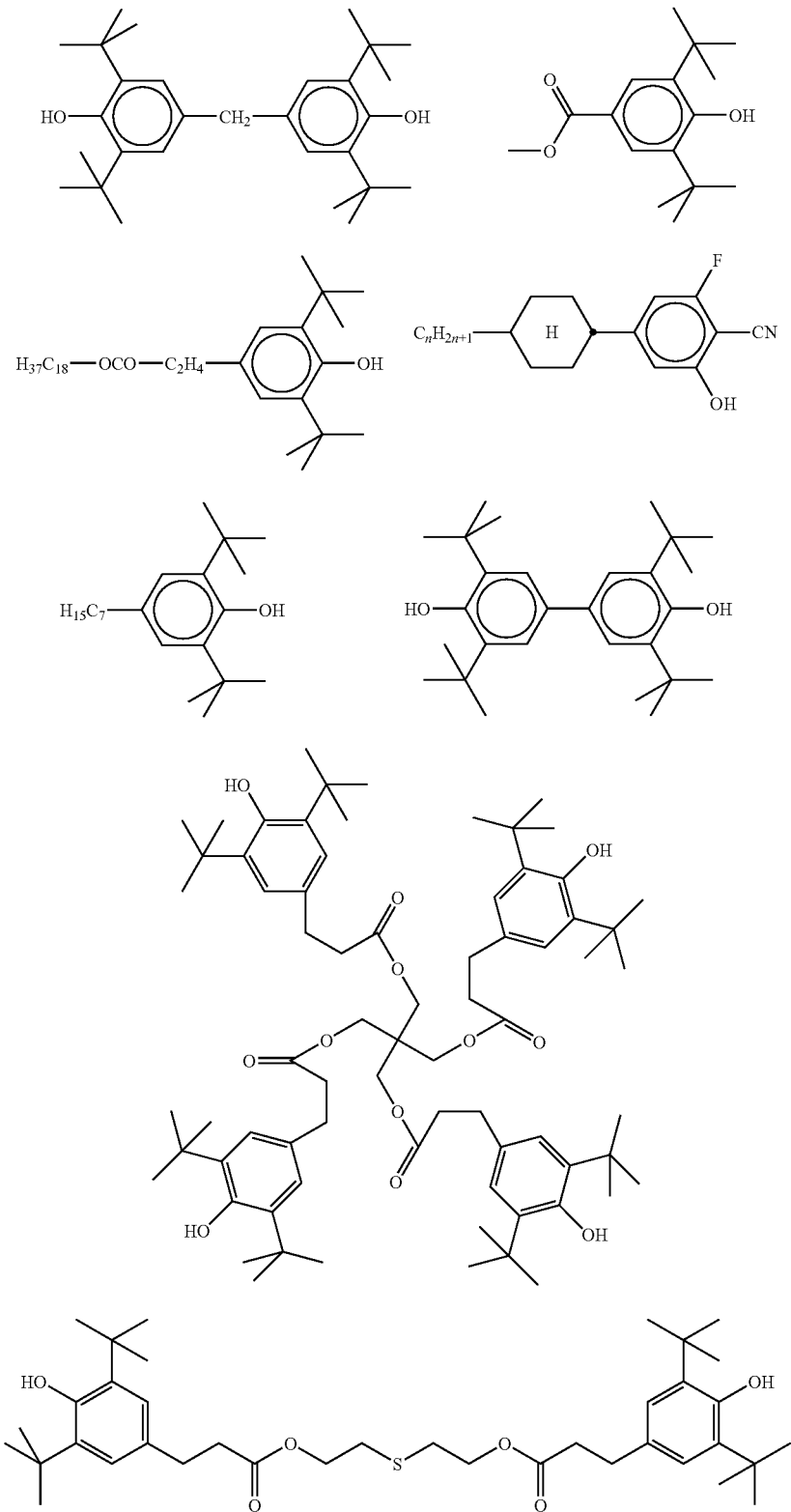

TABLE C-continued
Table C shows suitable stabilizers that are optionally added to the LC media according to the present invention (wherein n is an integer from 1 to 12).
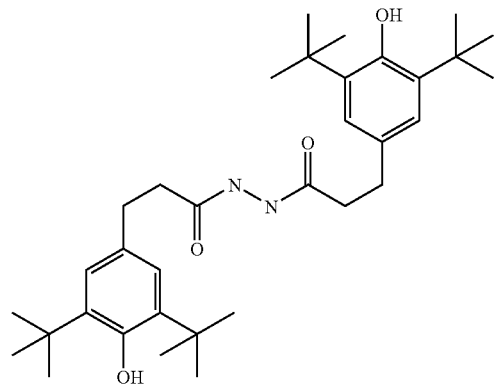
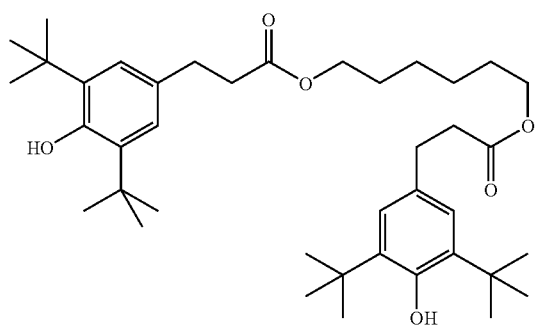
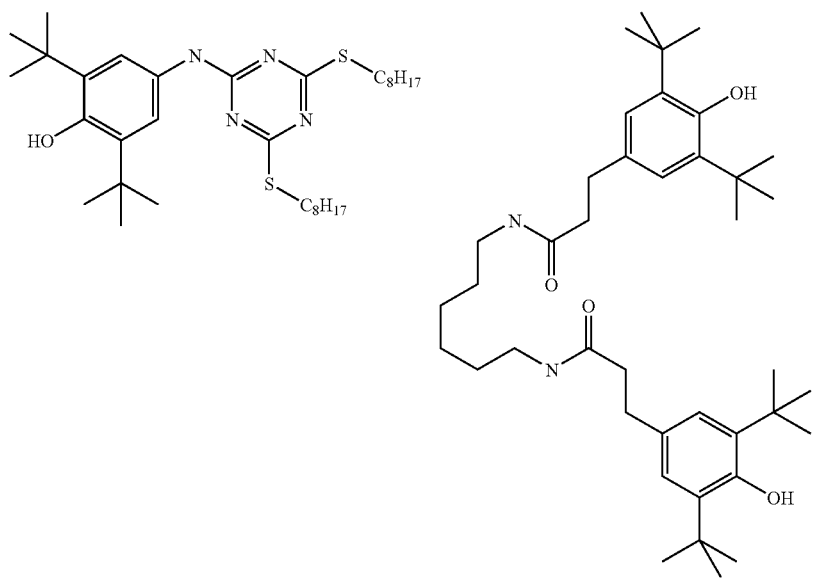

TABLE C-continued
Table C shows suitable stabilizers that are optionally added to the
LC media according to the present invention (wherein n is an integer from
1 to 12).
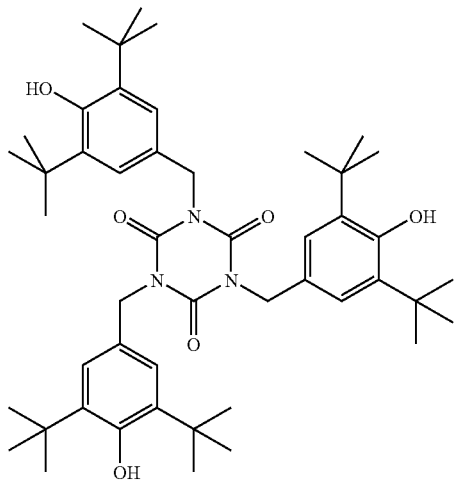
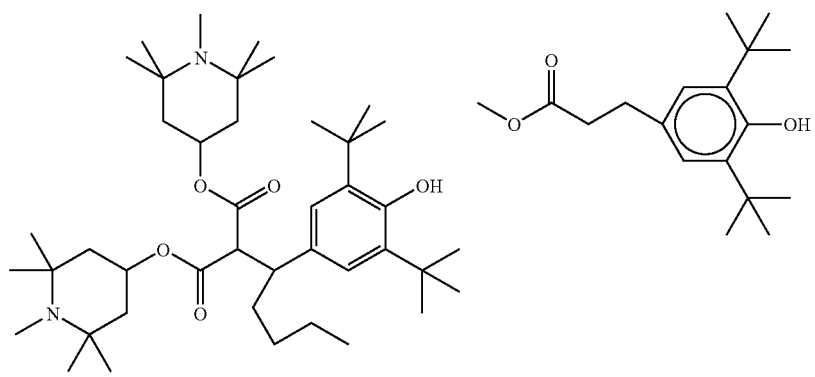
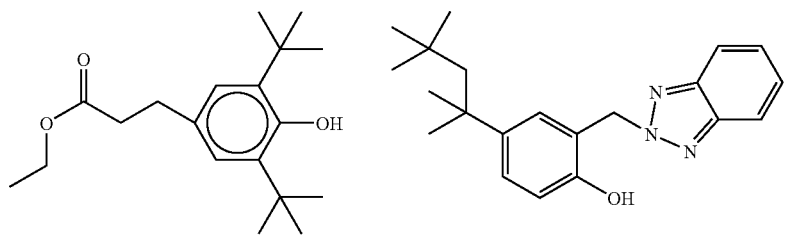
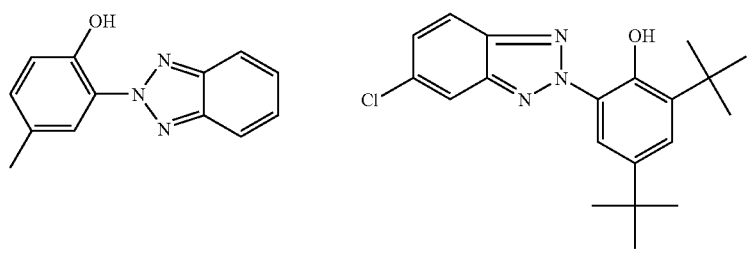

TABLE C-continued
Table C shows suitable stabilizers that are optionally added to the LC media according to the present invention (wherein n is an integer from 1 to 12).
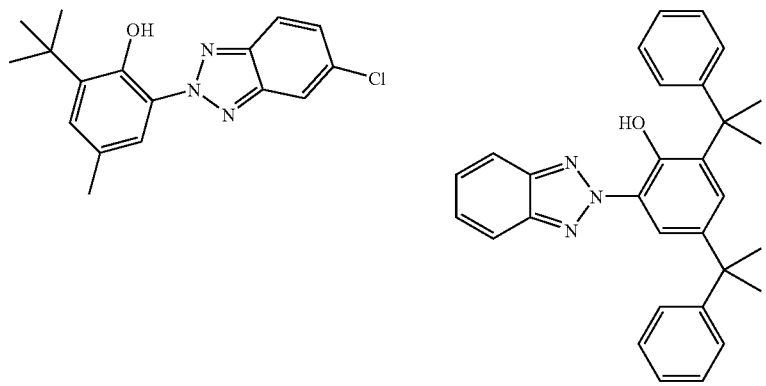
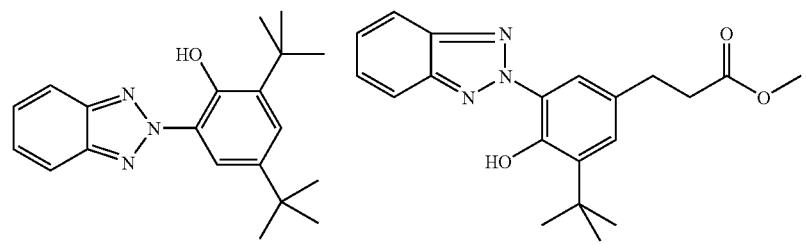
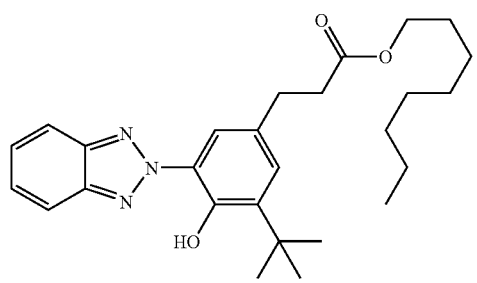
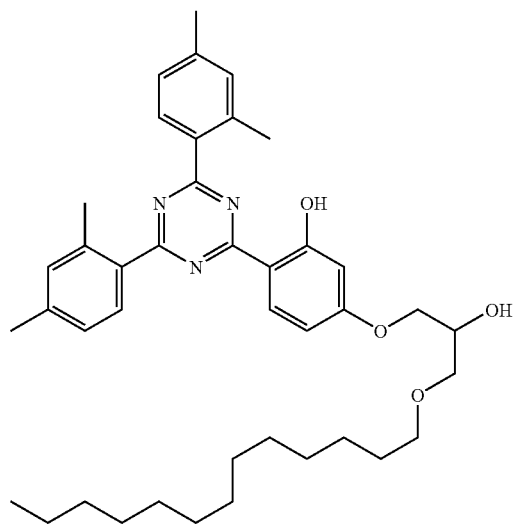

TABLE C-continued

Table C shows suitable stabilizers that are optionally added to the LC media according to the present invention (wherein n is an integer from 1 to 12).

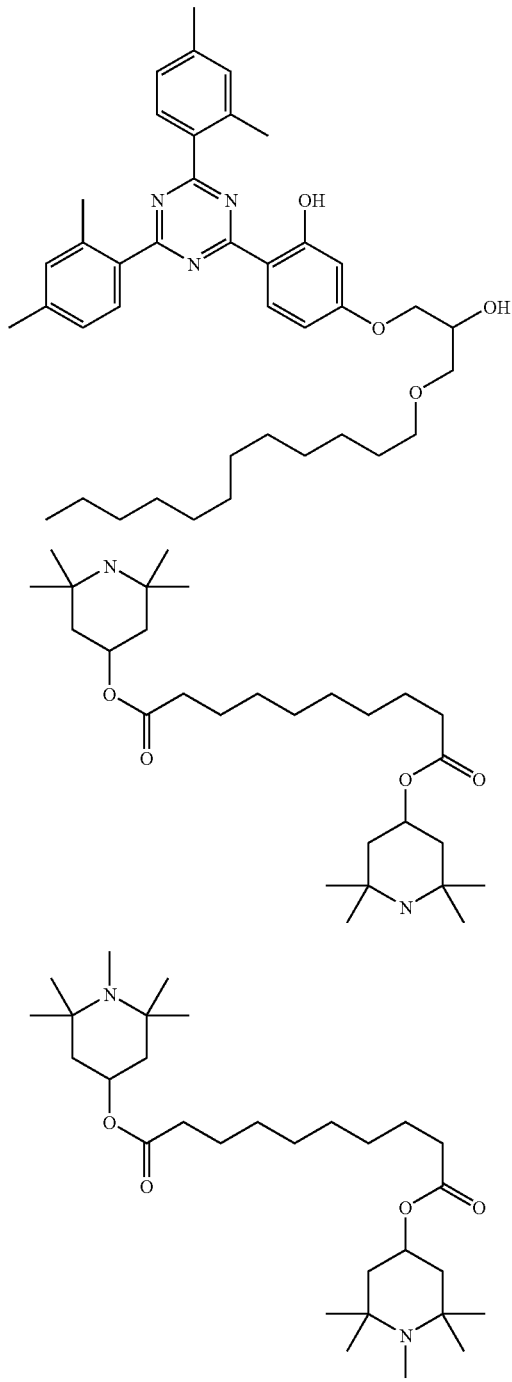

Preferably the LC media according to the present invention comprise 0 to 10 wt. %, very preferably 0.01 to 5 wt. %, most preferably 0.1 to 3 wt. % of stabilizers. Preferably the LC media according to the present invention comprise one or more stabilizers selected from the compounds of table C.

Above and below, percentages are per cent by weight. All temperatures are given in degrees Celsius. m.p. denotes melting point, cl.p.=clearing point. Furthermore, C=crystalline state, S=smectic phase, N=nematic phase, Ch=cholesteric phase and I=isotropic phase. The data between these symbols represent the transition temperatures.

Furthermore, the following abbreviations are used:
Δn optical anisotropy at 589 nm and 20° C.
$n_e$ extraordinary refractive index at 589 nm and 20° C.

Δ∈ dielectric anisotropy at 20° C. and 1 kHz
∈∥ dielectric constant parallel to the longitudinal molecular axis at 20° C. and 1 kHz
∈⊥ dielectric constant perpendicular to the longitudinal molecular axis at 20° C. and 1 kHz
$\gamma_1$ rotational viscosity [mPa·sec], at 20° C. unless stated otherwise
λ reflection wavelength [nm], at 20° C. unless stated otherwise
Δλ maximum variation of the reflection wavelength [nm] in the temperature range indicated, between −20 and +70° C. unless stated otherwise The helical twisting power HTP of a chiral compound which produces a helically twisted superstructure in a liquid-crystalline mixture is given by the equation $HTP=(p·c)^{-1}$ [$\mu m^{-1}$], in which p denotes the helix pitch of the helically twisted phase in μm and c denotes the concentration of the chiral compound (a value of 0.01 for c corresponds, for example, to a concentration of 1% by weight). Unless stated otherwise, HTP values above and below relate to a temperature of 20° C. and the commercially available neutral nematic TN host mixture MLC-6260 (Merck KGaA, Darmstadt).

The physical parameters were determined experimentally as described in "Licristal, Physical Properties Of Liquid Crystals, Description of the measurement methods", Ed. W. Becker, Merck KGaA, Darmstadt, revised edition, 1998.

Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding European Patent Application No. 08004051.2, filed Mar. 5, 2008.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions. The invention will now be described in more detail by reference to the following examples, which are illustrative only and do not limit the scope of the invention.

EXAMPLE 1

A nematic component N1 consisting of

| ME2N.F | 6.0% | cl.p. | 91° C. |
| --- | --- | --- | --- |
| ME3N.F | 6.0% | Δn | 0.2022 |
| ME4N.F | 13.0% | $n_e$ | 1.7051 |
| CY-3-O4 | 16.0% | Δ∈ | +15.6 |
| CCY-3-O2 | 6.0% | ∈⊥ | 9.3 |
| CCY-3-O3 | 6.0% | | |
| CPY-2-O2 | 10.0% | | |
| CPY-3-O2 | 10.0% | | |
| PPTUI-3-2 | 15.0% | | |
| PPTUI-3-4 | 12.0% | | | shows high values of ∈⊥, of the dielectric anisotropy Δ∈, of the birefringence Δn, and of the clearing point.

A cholesteric mixture C1 containing 97.1% of nematic component N1 and 2.9% of the chiral dopant R-5011 of the following formula

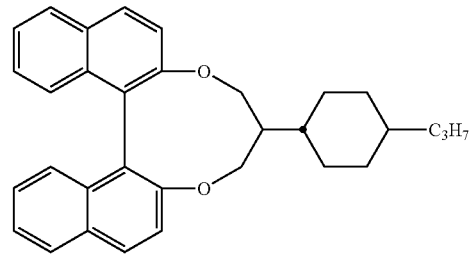

XVIIb1 has a reflection wavelength λ of 483 nm and is suitable for use in SSCT displays.

EXAMPLE 2

A nematic component N2 consisting of

| ME2N.F | 8.0% | cl.p. | 91° C. |
| --- | --- | --- | --- |
| ME3N.F | 8.0% | Δn | 0.2004 |
| ME4N.F | 16.0% | $n_e$ | 1.7050 |
| HP-3N.F | 5.0% | Δ∈ | +27.9 |
| CY-3-O4 | 11.0% | ∈⊥ | 10.1 |
| CCY-3-O2 | 5.0% | | |
| CCY-3-O3 | 5.0% | | |
| CPY-2-O2 | 10.0% | | |
| CPY-3-O2 | 10.0% | | |
| PPTUI-3-2 | 15.0% | | |
| PPTUI-3-4 | 7.0% | | | shows high values of ∈⊥, of the dielectric anisotropy Δ∈, of the birefringence Δn, and of the clearing point.

A cholesteric mixture C2 containing 97.4% of nematic component N2 and 2.6% of the chiral dopant R-5011 has a reflection wavelength λ of 514 nm and is suitable for use in SSCT displays.

COMPARATIVE EXAMPLE 1

A nematic host component N3 consisting of

| | | | |
|---|---|---|---|
| PCH-3N.F.F | 6.0% | cl.p. | 91.5° C. |
| ME2N.F | 2.5% | Δn | 0.2006 |
| PZU-V2-N | 9.0% | $n_e$ | 1.7038 |
| CP-1V-N | 10.0% | Δε | +15.4 |
| CP-V2-N | 10.0% | $\epsilon_\perp$ | 4.7 |
| CC-3-V1 | 7.0% | | |
| CC-3-V | 10.0% | | |
| CVCP-V-O1 | 4.5% | | |
| CVCP-1V-O1 | 4.0% | | |
| PPTUI-3-2 | 20.0% | | |
| PPTUI-3-4 | 17.0% | | | shows similar values of the dielectric anisotropy Δε, the birefringence Δn, and the clearing point, but has a significantly lower value of $\epsilon_\perp$.

COMPARATIVE EXAMPLE 2

A nematic host component N4 consisting of

| | | | |
|---|---|---|---|
| ME2N.F | 5.0% | cl.p. | 90.0° C. |
| ME3N.F | 5.0% | Δn | 0.2028 |
| ME4N.F | 9.0% | $n_e$ | 1.7112 |
| CP-1V-N | 13.0% | Δε | +16.4 |
| CP-V2-N | 13.0% | $\epsilon_\perp$ | 5.1 |
| CC-3-V | 12.0% | | |
| CVCP-V-O1 | 5.0% | | |
| CVCP-1V-O1 | 5.0% | | |
| PPTUI-3-2 | 20.0% | | |
| PPTUI-3-4 | 13.0% | | | shows similar values of the dielectric anisotropy Δε, the birefringence Δn, and the clearing point, but has a significantly lower value of $\epsilon_\perp$.

EXAMPLE 3

A nematic component N5 consisting of

| | | | |
|---|---|---|---|
| DU-2-N | 8.0% | cl.p. | 87° C. |
| PCH-3N.F.F | 13.5% | Δn | 0.1968 |
| ME2N.F | 2.5% | $n_e$ | 1.6970 |
| ME3N.F | 3.0% | Δε | +12.7 |
| CY-3-O4 | 9.0% | $\epsilon_\perp$ | 9.0 |
| CCY-3-O2 | 6.0% | | |
| CCY-3-O3 | 6.0% | | |
| CPY-2-O2 | 10.0% | | |
| CPY-3-O2 | 10.0% | | |
| PPTUI-3-2 | 17.0% | | |
| PPTUI-3-4 | 15.0% | | | shows high values of $\epsilon_\perp$, of the dielectric anisotropy Δε, of the birefringence Δn, and of the clearing point.

EXAMPLE 4

A nematic component N6 consisting of

| | | | |
|---|---|---|---|
| DU-2-N | 8.0% | cl.p. | 91° C. |
| PCH-3N.F.F | 7.0% | Δn | 0.2028 |
| ME2N.F | 2.5% | $n_e$ | 1.7037 |
| ME3N.F | 3.0% | Δε | +13.5 |
| ME4N.F | 5.0% | $\epsilon_\perp$ | 9.2 |
| CY-3-O4 | 10.0% | | |
| CCY-3-O2 | 6.0% | | |
| CCY-3-O3 | 6.0% | | |
| CPY-2-O2 | 10.5% | | |
| CPY-3-O2 | 10.5% | | |
| PPTUI-3-2 | 16.5% | | |
| PPTUI-3-4 | 15.0% | | | shows high values of $\epsilon_\perp$, of the dielectric anisotropy Δε, of the birefringence Δn, and of the clearing point.

A cholesteric mixture C3 containing 97.4% of nematic component N6 and 2.6% of the chiral dopant R-5011 has a reflection wavelength λ of 540 nm and is suitable for use in SSCT displays.

EXAMPLE 5

A nematic component N7 consisting of

| | | | |
|---|---|---|---|
| DU-2-N | 8.0% | cl.p. | 90° C. |
| PCH-3N.F.F | 10.0% | Δn | 0.2049 |
| ME2N.F | 2.0% | $n_e$ | 1.7029 |
| ME3N.F | 3.0% | Δε | +9.9 |
| CY-3-O4 | 7.5% | $\epsilon_\perp$ | 10.3 |
| CCY-3-O2 | 5.5% | | |
| CCY-3-O3 | 5.5% | | |
| CPY-2-O2 | 9.0% | | |
| CPY-3-O2 | 9.0% | | |
| PPTUI-3-2 | 15.0% | | |
| PPTUI-3-4 | 5.0% | | |
| PTP-302FF | 6.0% | | |
| PTP-502FF | 5.5% | | |
| CPTP-302FF | 4.5% | | |
| CPTP-502FF | 4.5% | | | shows high values of $\epsilon_\perp$, of the dielectric anisotropy Δε, of the birefringence Δn, and of the clearing point.

The invention claimed is:
1. A liquid-crystalline medium having a helically twisted structure comprising:
  a nematic component and an optically active component;
    wherein said optically active component comprises one or more chiral compounds whose helical twisting power and concentration are selected in such a way that the helix pitch of the medium is ≦1 μm; and
    wherein said nematic component comprises one or more compounds selected from the group consisting of compound of formula I and II

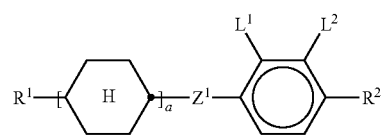

I

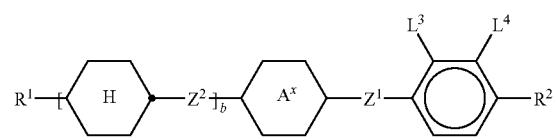

II in which
a is 1 or 2,
b is 0 or 1,

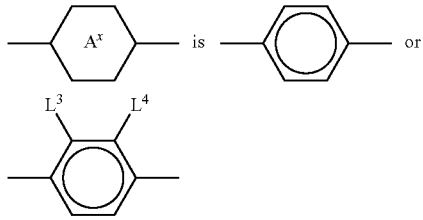

R$^1$ and R$^2$ are each, independently of each other, alkyl having from 1 to 12 C-atoms, wherein one or two non-adjacent CH$_2$-groups are each optionally replaced by —O—, —CH=CH—, —C≡C—, —CO—, —OCO— or —COO— in such a way that O atoms are not linked directly to one another, Z$^1$ and Z$^2$ are each, independently of each other, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, or a single bond, and Z$^1$ in formula II may also denote —C≡C—, and L$^{1-4}$ are each, independently of each other, F, Cl, OCF$_3$, CF$_3$, CH$_3$, CH$_2$F, or CHF$_2$.

2. A medium according to claim 1, wherein said nematic component comprises one or more compounds of the following formulae:

I1
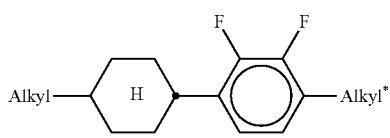

I2
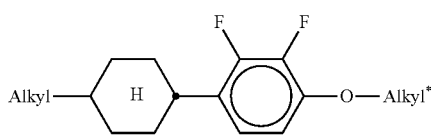

I9
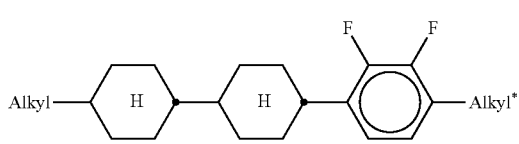

I10
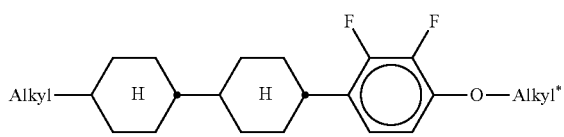

I11
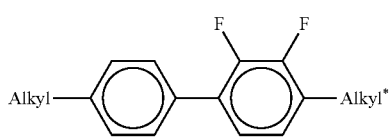

II2
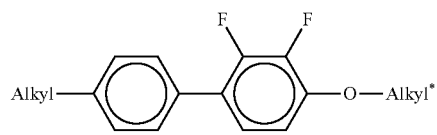

II9
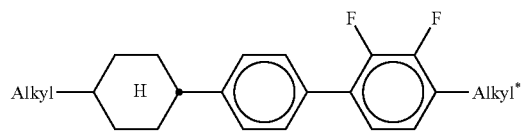

II10
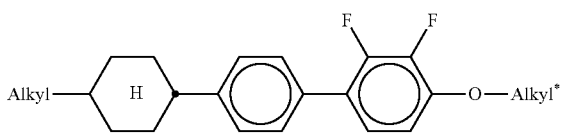

wherein
a is 1 or 2,
Alkyl and Alkyl* are each, independently of each other, straight chain alkyl having 1 to 6 C-atoms, and
Alkenyl is straight chain alkenyl having 2 to 6 C-atoms.

3. A medium according to claim 1, wherein said nematic component further comprises one or more compounds of formula III:

III
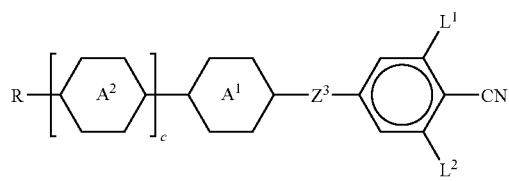

in which
c is 0 or 1,
R is alkyl having from 1 to 12 C-atoms, wherein one or two non-adjacent CH$_2$-groups are each optionally replaced by —O—, —CH=CH—, —C≡C—, —CO—, —OCO— or —COO— in such a way that O atoms are not linked directly to one another,

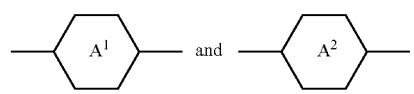

are each, independently of one another,

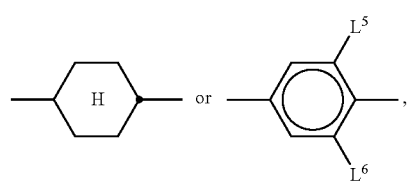

L$^1$ to L$^6$ are each, independently of one another, H or F, and $Z^3$ is —COO— or, if at least one of $A^1$ and $A^2$ is trans-1,4-cyclohexylene, $Z^3$ can also be —CH$_2$CH$_2$— or a single bond.

4. A medium according to claim 1, wherein said nematic component further comprises one or more compounds of the following formulae:

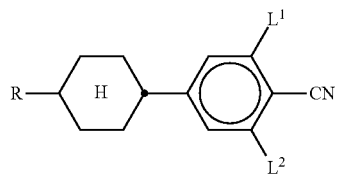
IIIa

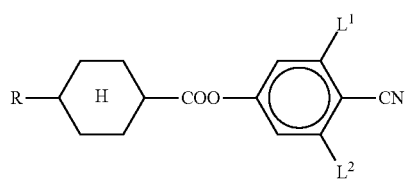
IIIb

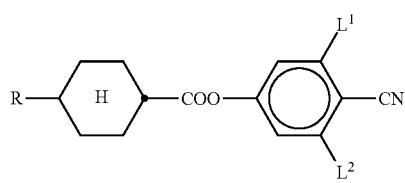
IIIc

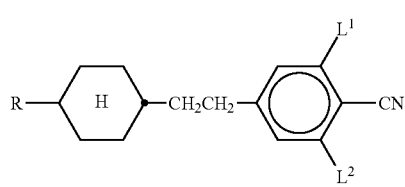
IIId

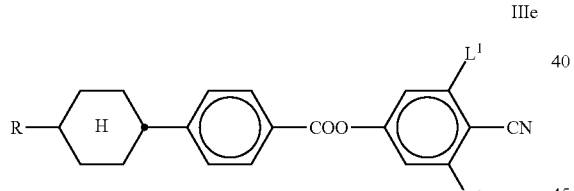
IIIe

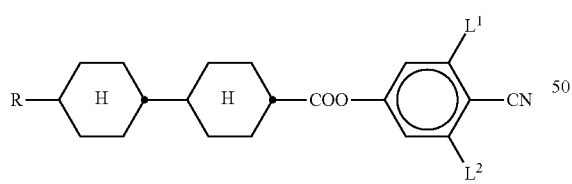
IIIf in which
R is alkyl having 1 to 12 C-atoms, wherein one or two non-adjacent CH$_2$-groups are each optionally replaced by —O—, —CH═CH—, —C≡C—, —CO—, —OCO— or —COO— in such a way that O atoms are not linked directly to one another, and $L^1$ and $L^2$ are each, independently of one another, H or F.

5. A medium according to claim 1, wherein said nematic component further comprises one or more compounds of formula V:

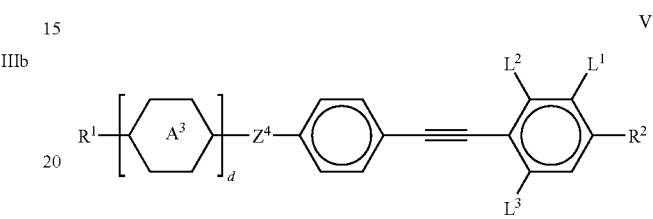
V in which
d is 0 or 1,
$R^1$ and $R^2$ are each, independently of each other, alkyl having 1 to 12 C-atoms, wherein one or two non-adjacent CH$_2$-groups are each optionally replaced by —O—, —CH═CH—, —C≡C—, —CO—, —OCO— or —COO— in such a way that O atoms are not linked directly to one another,

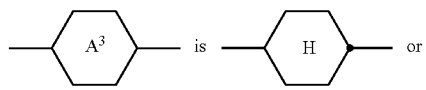

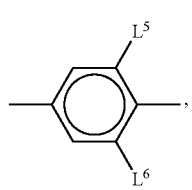

$L^1$ to $L^6$ are each, independently of one another H or F, and $Z^4$ is —COO—, —CH$_2$CH$_2$—, or a single bond.

6. A medium according to claim 1, wherein said medium comprises one or more chiral compounds of the following formulae:

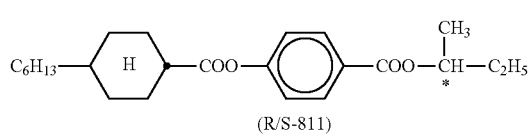
X (R/S-811)

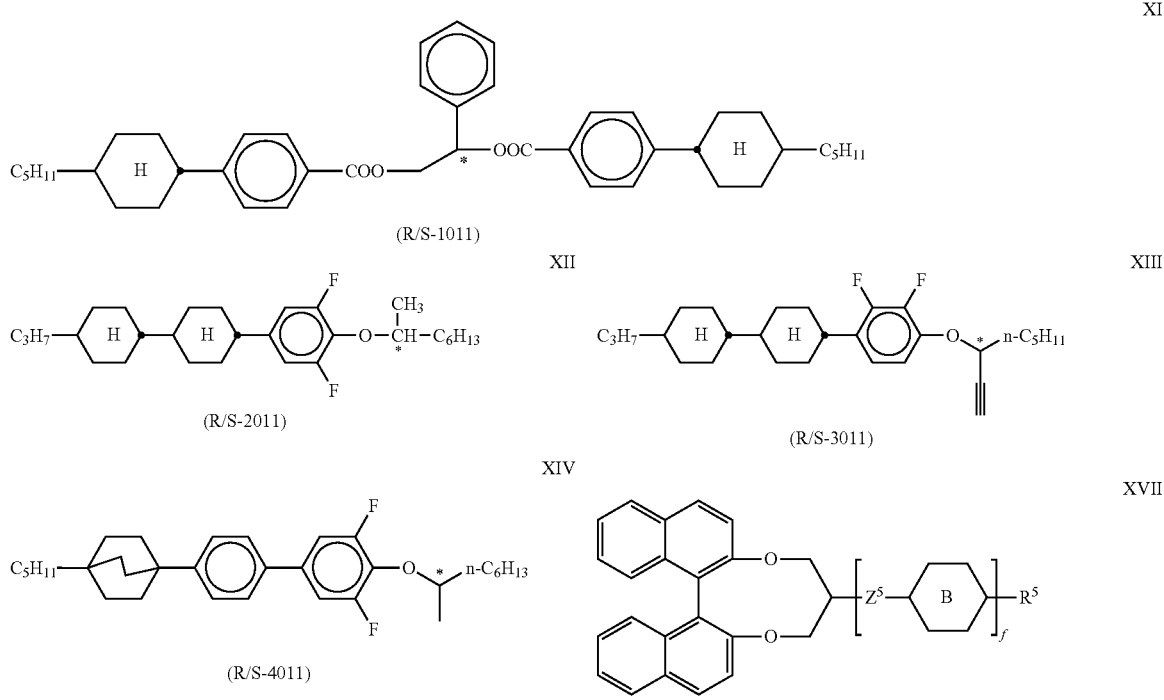

in which
B is 1,4-phenylene which is optionally mono-, di- or trisubstituted by L, or is 1,4-cyclohexylene,
L is H, F, Cl, CN or optionally halogenated alkyl having 1-7 carbon atoms, alkoxy having 1-7 carbon atoms, alkylcarbonyl having up to 7 carbon atoms, alkoxycarbonyl having up to 7 carbon atoms, alkylcarbonyloxy having up to 7 carbon atoms, or alkoxycarbonyloxy having up to 7 carbon atoms,
f is 0, 1, or 2,
$Z^5$ is —COO—, —OCO—, —CH$_2$CH$_2$—, or a single bond, and
$R^5$ is alkyl having 1-12 carbon atoms, alkoxy having 1-12 carbon atoms, alkylcarbonyl having up to 12 carbon atoms, alkoxycarbonyl having up to 12 carbon atoms, or alkylcarbonyloxy having up to 12 carbon atoms.

7. A medium according to claim 3, wherein said nematic component comprises
10 to 50% of compounds of the formula I,
10 to 60% of compounds of the formula II,
5 to 40% of compounds of the formula III,
10 to 40% of compounds of the formula V

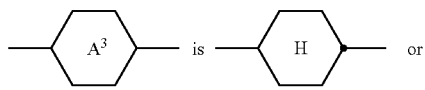

in which
d is 0 or 1, $R^1$ and $R^2$ are each, independently of each other, alkyl having 1 to 12 C-atoms, wherein one or two non-adjacent CH$_2$-groups are each optionally replaced by —O—, —CH═CH—, —C≡C—, —CO—, —OCO— or —COO— in such a way that O atoms are not linked directly to one another,

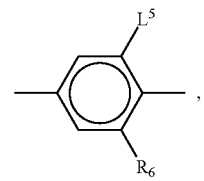

$L^1$ to $L^6$ are each, independently of one another H or F, and $Z^4$ is —COO—, —CH$_2$CH$_2$—, or a single bond.

8. A medium according to claim 1, wherein said nematic component has a dielectric constant $\in_\perp$ of $\geqq 6$.

9. A medium according to claim 1, wherein $R^1$ and $R^2$ are each, independently of each other, alkyl having from 1 to 6 C-atoms or alkoxy having from 1 to 6 C-atoms, and $Z^1$ and $Z^2$ are each a single bond.

10. A medium according to claim 1, wherein both $L^1$ and $L^2$ denote F, or one of $L^1$ and $L^2$ is F and the other is Cl; and both $L^3$ and $L^4$ denote F, or one of $L^3$ and $L^4$ is F and the other is Cl.

11. A medium according to claim 4, wherein said nematic component comprises one or more compounds of formula IIIa, IIIb or IIIe, in which $L^1$ is F, $L^2$ is F, or both $L^1$ and $L^2$ are F.

12. A medium according to claim 4, wherein said nematic component comprises one or more compounds of formula IIIf in which $L^2$ is H and $L^1$ is H or F.

13. A medium according to claim 5, wherein said nematic component further comprises one or more compounds of the following formulae:

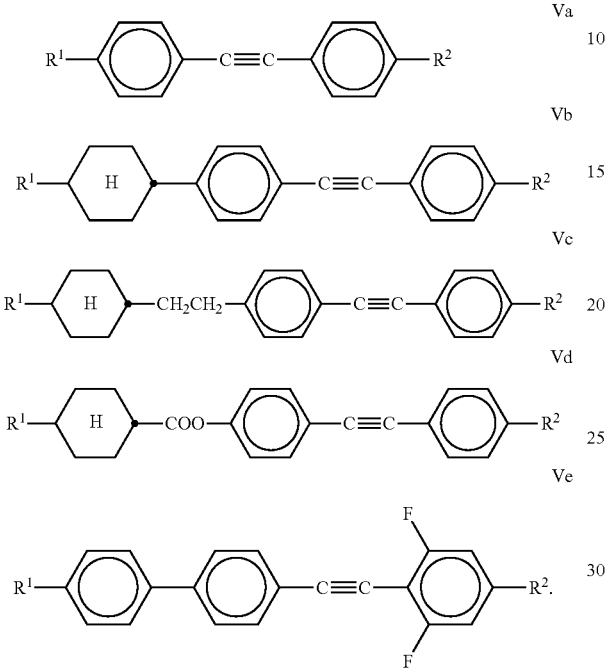

14. A medium according to claim 13, wherein said nematic component comprises one or more compounds selected from formulae Va, Vb and Ve.

15. A medium according to claim 1, wherein said nematic component additionally comprises one or more compounds selected from formulae VI1 and VI2

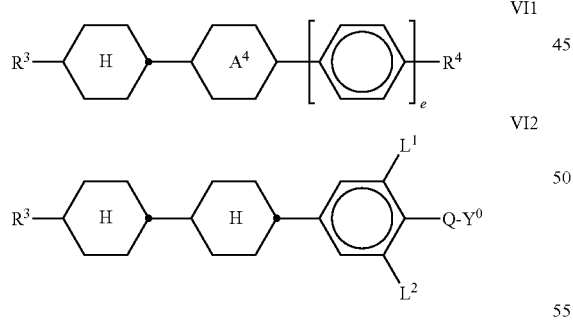

in which
A$^4$ is 1,4-phenylene or trans-1,4-cyclohexylene,
e is 0 or 1,
R$^3$ is an alkenyl group having from 2 to 7 carbon atoms,
R$^4$ is an alkyl, alkoxy or alkenyl, in each case having up to 12 carbon atoms, in which, in addition, one or two non-adjacent CH$_2$ groups are each optionally replaced by —O—, —CH=CH—, —C≡C—, —CO—, —OCO— or —COO— in such a way that O atoms are not linked directly to one another,
Q is CF$_2$, OCF$_2$, CFH, OCFH or a single bond,
Y$^0$ is F or Cl, and
L$^1$ and L$^2$ are each, independently of one another, H or F.

16. A medium according to claim 1, wherein said nematic component additionally comprises medium one or more compounds of formula XVIII

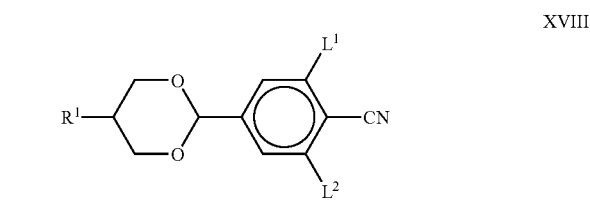

wherein
R$^1$ is alkyl having from 1 to 12 C-atoms, wherein one or two non-adjacent CH$_2$-groups are each optionally replaced by —O—, —CH=CH—, —C≡C—, —CO—, —OCO— or —COO— in such a way that O atoms are not linked directly to one another,
L$^{1-2}$ are each, independently of each other, F, Cl, OCF$_3$, CF$_3$, CH$_3$, CH$_2$F, or CHF$_2$.

17. A medium according to claim 16, wherein said one or more compounds of formula XVIII are selected from the following formulae:

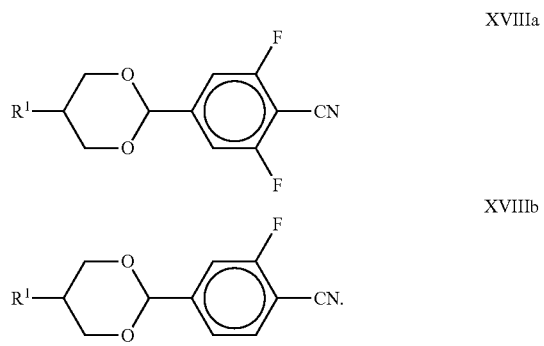

18. A medium according to claim 1, wherein said nematic medium contains one or more compounds of formula II selected from the following formulae:

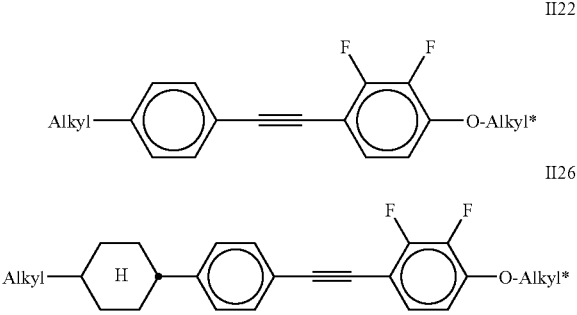

wherein Alkyl and Alkyl* are each, independently of each other, straight chain alkyl having from 1 to 6 C-atoms.

19. A medium according to claim 1,
wherein both $L^1$ and $L^2$ denote F, or one of $L^1$ and $L^2$ is F and the other is Cl, or
wherein both $L^3$ and $L^4$ denote F, or one of $L^3$ and $L^4$ is F and the other is Cl.

20. An electro-optical liquid-crystal display containing a medium according to claim 1.

21. An electro-optical liquid-crystal display according to claim 20, wherein said display is a cholesteric, SSCT, PSCT or flexoelectric display.

22. A method of generating an electro-optical effect comprising applying a voltage to a display according to claim 20.

* * * * *

UNITED STATES PATENT AND TRADEMARK OFFICE
CERTIFICATE OF CORRECTION

| | | |
|---|---|---|
| PATENT NO. | : 7,887,717 B2 | Page 1 of 1 |
| APPLICATION NO. | : 12/397439 | |
| DATED | : February 15, 2011 | |
| INVENTOR(S) | : Akihiro Kojima et al. | |

It is certified that error appears in the above-identified patent and that said Letters Patent is hereby corrected as shown below:

Column 69, line 16 reads:

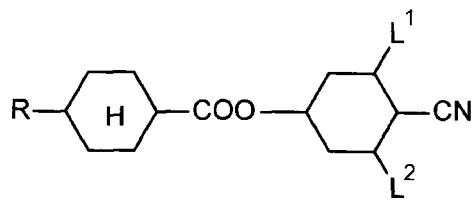

Should read:

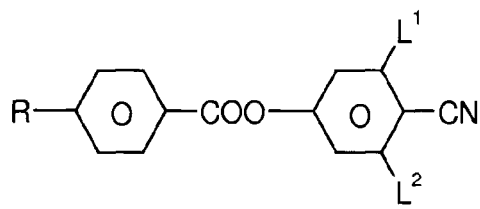

Column 69, line 63 reads (Last figure (Figure X) in Column 69):

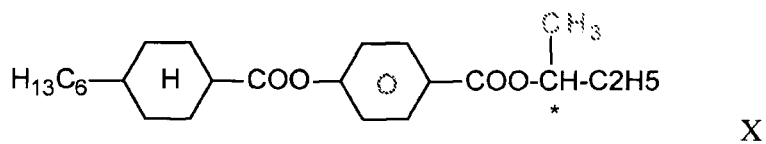

Should be in column 70 under Claim 6 line 57:

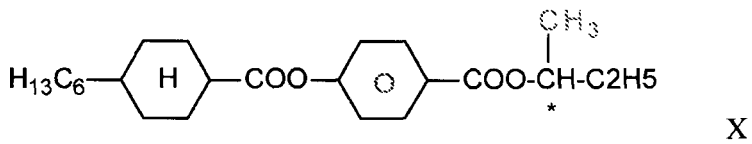

Signed and Sealed this
Nineteenth Day of April, 2011

David J. Kappos
*Director of the United States Patent and Trademark Office*